(12) United States Patent
Hatalkar et al.

(10) Patent No.: US 9,952,660 B2
(45) Date of Patent: Apr. 24, 2018

(54) USER INTERACTION WITH WEARABLE DEVICES

(71) Applicant: Intel Corporation, Santa Clara, CA (US)

(72) Inventors: Atul N. Hatalkar, Chandler, AZ (US); Anna-Marie Mansour, San Francisco, CA (US); Fai Yeung, Palo Alto, CA (US); Norman T. Bright, Portland, OR (US); Dzung D. Tran, Beaverton, OR (US); Fu Zhou, San Jose, CA (US); Nicholas Moe Khosravy, Palo Alto, CA (US); Charles Carter Jernigan, Santa Clara, CA (US); Kahyun Kim, Hillsboro, OR (US); Eric Lewallen, Portland, OR (US); Rowland L. Brown, Portland, OR (US); James W. Lundell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 14/735,932

(22) Filed: Jun. 10, 2015

(65) Prior Publication Data
US 2015/0355720 A1 Dec. 10, 2015

Related U.S. Application Data

(60) Provisional application No. 62/010,405, filed on Jun. 10, 2014.

(51) Int. Cl.
*G09G 5/00* (2006.01)
*G06F 3/01* (2006.01)
*G06F 3/038* (2013.01)
*H04M 1/725* (2006.01)

(52) U.S. Cl.
CPC ............... *G06F 3/01* (2013.01); *G06F 3/038* (2013.01); *H04M 1/7253* (2013.01); *G06F 2203/0384* (2013.01); *H04M 1/72519* (2013.01)

(58) Field of Classification Search
USPC ............ 345/156, 158, 173; 455/457; 463/7; 715/766
See application file for complete search history.

(56) References Cited

U.S. PATENT DOCUMENTS

| | | | | |
|---|---|---|---|---|
| 2005/0116927 A1* | 6/2005 | Voelckers | ............. | G06F 3/0236 345/157 |
| 2009/0221337 A1* | 9/2009 | Tranum | ................. | A63H 33/00 463/7 |
| 2010/0013748 A1* | 1/2010 | Cok | ......................... | H04N 9/67 345/83 |

(Continued)

*Primary Examiner* — Thuy Pardo
(74) *Attorney, Agent, or Firm* — Patent Capital Group

(57) ABSTRACT

Particular embodiments described herein provide for an electronic device that can be configured to determine that an unobtrusive gesture has been received on a first electronic device and send a signal to a second electronic device in response to the unobtrusive gesture. The first electronic device can also be configured to receive a signal from the second electronic device, determine an unobtrusive output in response to the signal, and generate an unobtrusive notification in response to the received signal. In an example, the first electronic device is a part of jewelry worn by a user.

16 Claims, 19 Drawing Sheets

(56) References Cited

U.S. PATENT DOCUMENTS

| | | | |
|---|---|---|---|
| 2011/0018794 A1* | 1/2011 | Linsky | G06F 1/163 345/156 |
| 2011/0081923 A1* | 4/2011 | Forutanpour | G06F 1/1694 455/457 |
| 2013/0050080 A1* | 2/2013 | Dahl | G01S 5/18 345/158 |
| 2013/0307775 A1* | 11/2013 | Raynor | G06F 3/017 345/158 |
| 2014/0139455 A1* | 5/2014 | Argiro | A63F 13/02 345/173 |
| 2014/0201657 A1* | 7/2014 | Nagamine | G06F 3/0484 715/766 |
| 2014/0292720 A1* | 10/2014 | Liang | H04L 67/06 345/174 |
| 2015/0261495 A1* | 9/2015 | Smus | G06F 3/167 345/156 |
| 2015/0277575 A1* | 10/2015 | Ataee | G06F 3/015 345/156 |
| 2015/0332075 A1* | 11/2015 | Burch | G06K 7/10821 345/156 |

* cited by examiner

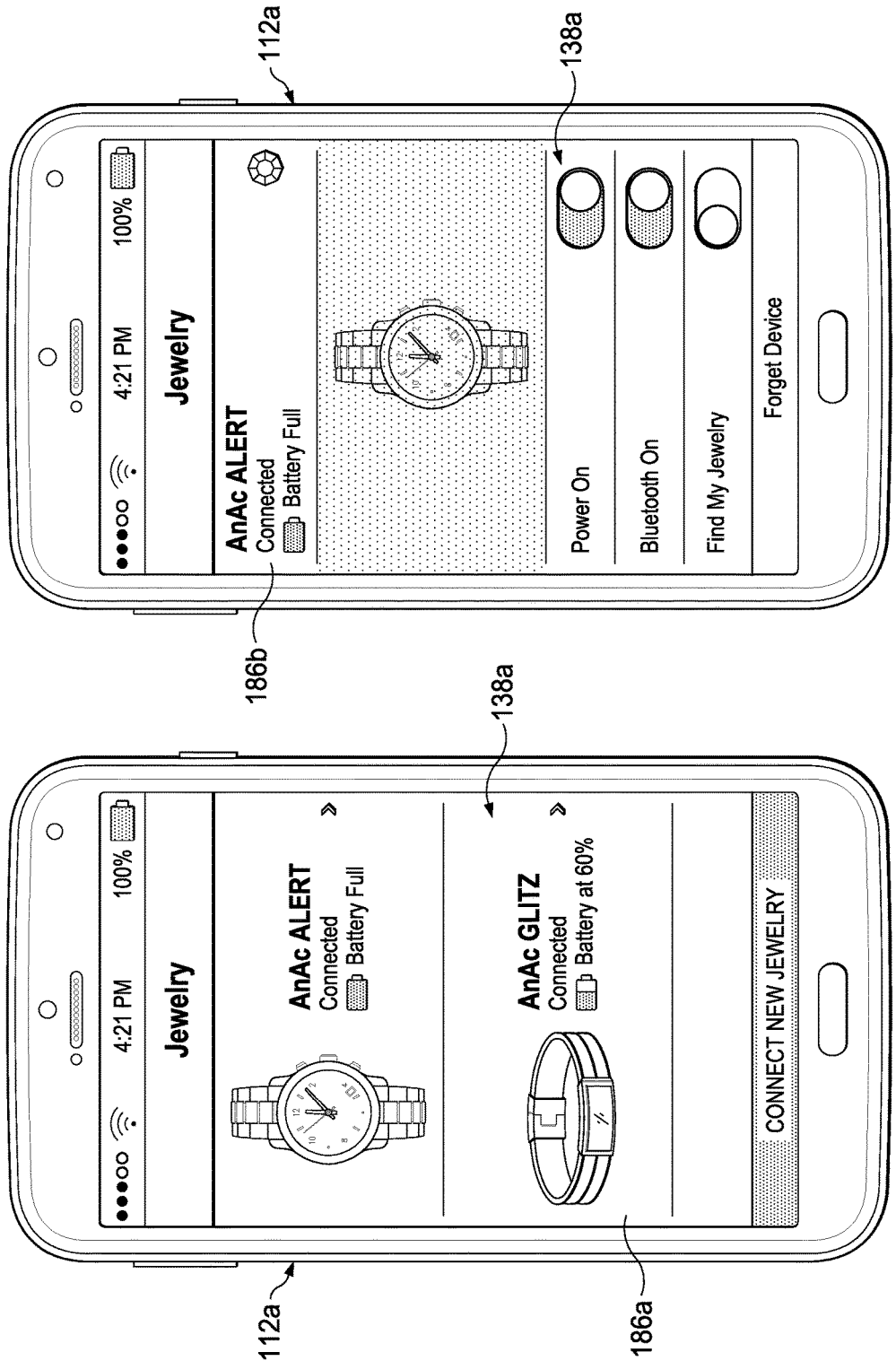

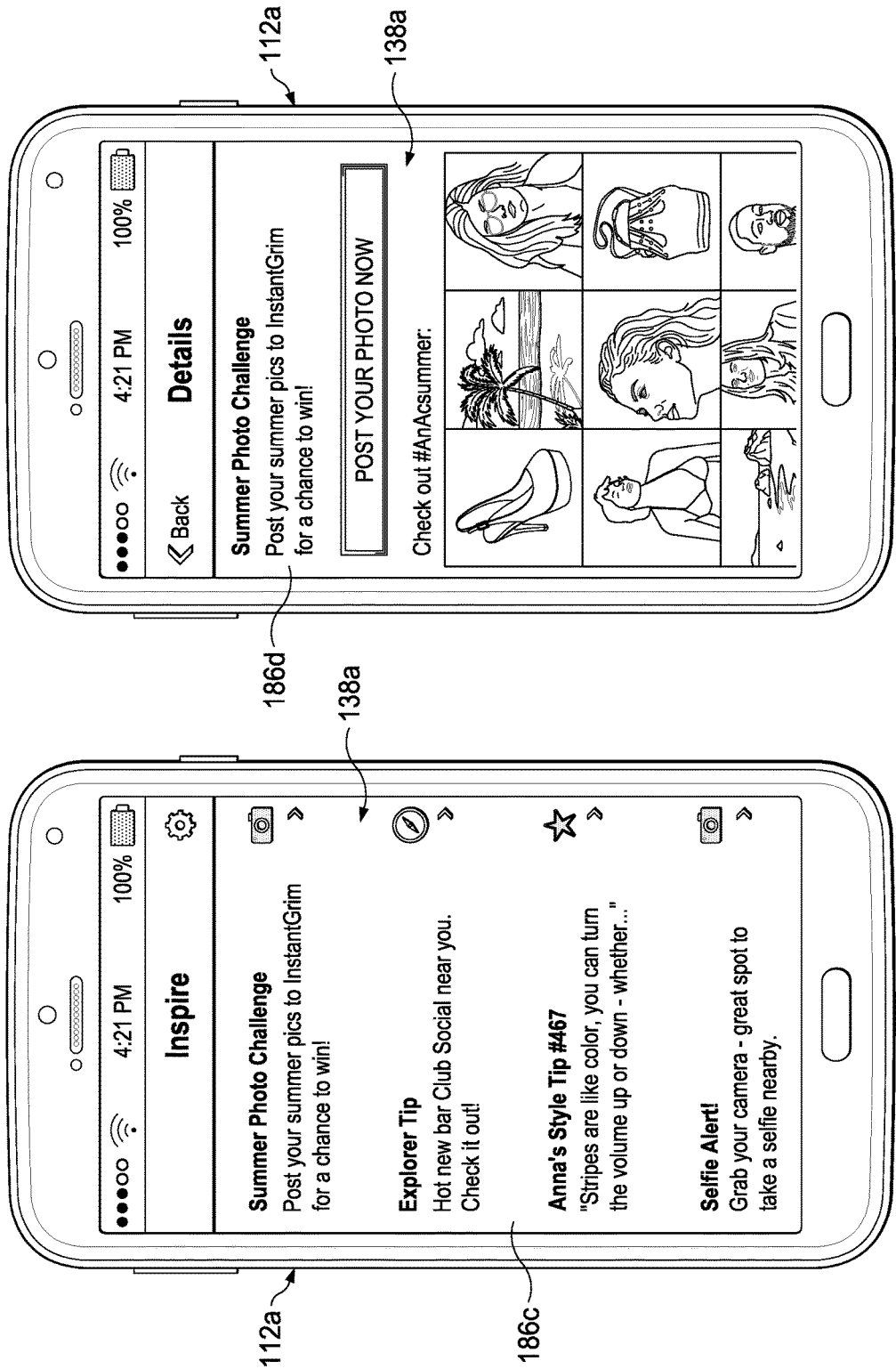

USER INTERACTION WITH WEARABLE DEVICES

CROSS-REFERENCE TO RELATED APPLICATION

This application claims the benefit of priority under 35 U.S.C. § 119(e) to U.S. Provisional Application No. 62/010,405, entitled "USER INTERACTION WITH WEARABLE DEVICES" filed in the U.S. Patent Office on Jun. 10, 2014, which is hereby incorporated by reference in its entirety.

TECHNICAL FIELD

This disclosure relates in general to the field of electronic devices, and more particularly, to user interaction with wearable devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 9 is a simplified block diagram of a portion of a communication system in accordance with an embodiment of the present disclosure;

FIG. 10 is a simplified block diagram of a portion of a communication system in accordance with an embodiment of the present disclosure;

FIG. 11 is a simplified block diagram of a portion of a communication system in accordance with an embodiment of the present disclosure;

FIG. 12 is a simplified block diagram of a portion of a communication system in accordance with an embodiment of the present disclosure;

FIG. 18 is a simplified block diagram of a portion of a communication system in accordance with an embodiment of the present disclosure;

FIG. 21 is a simplified block diagram of a portion of a communication system in accordance with an embodiment of the present disclosure;

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
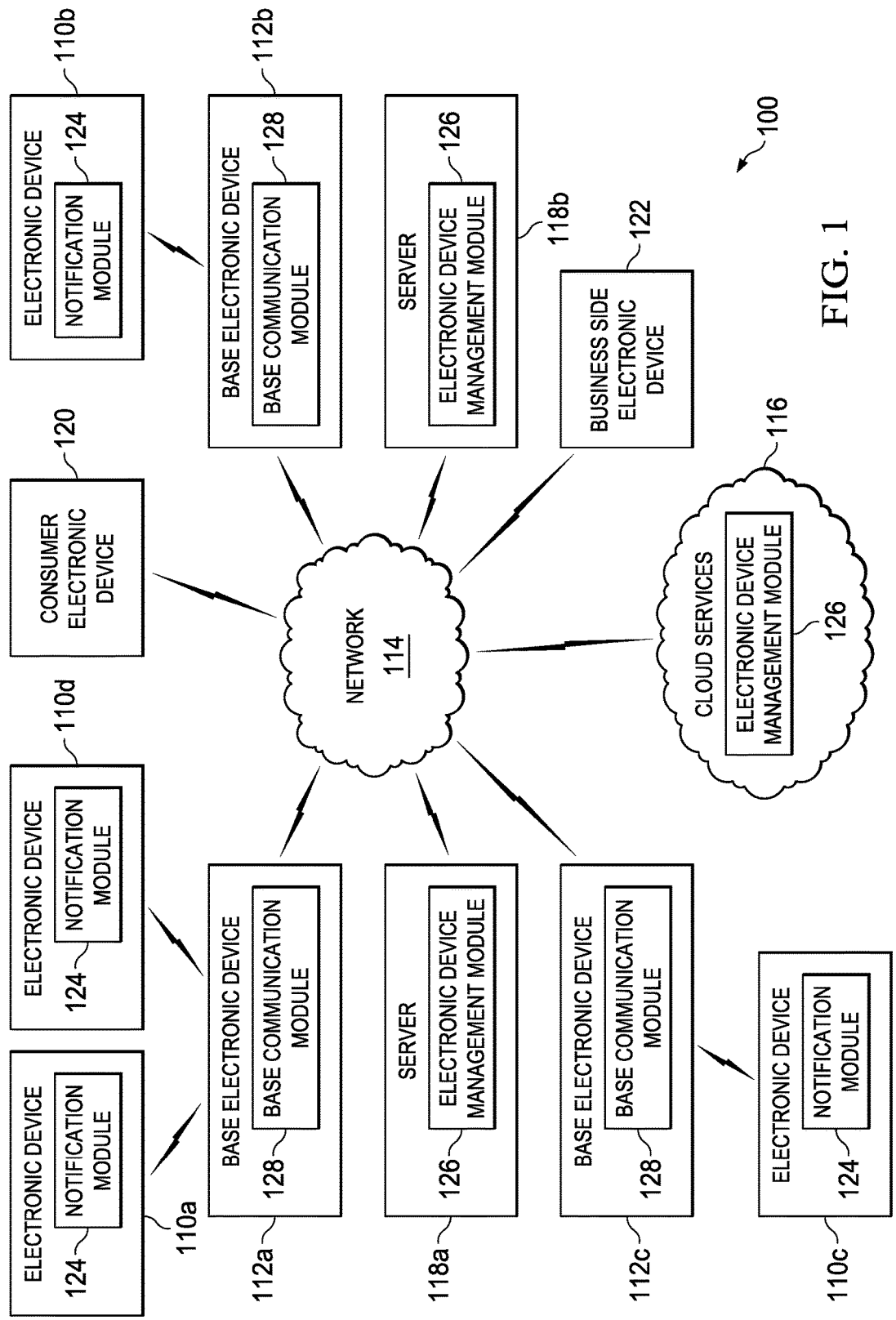
FIG. 1 is a simplified block diagram of a communication system in accordance with an embodiment of the present disclosure.

FIG. 1 is a simplified block diagram of a communication system 100 to allow for user interaction with one or more wearable devices. Communication system 100 can include one or more electronic devices 110a-110d, one or more base electronic devices 112a-112c, cloud services 116, one or more servers 118a and 118b, a consumer electronic device 120, and a business side electronic device 122. Each electronic device 110a-110d can include a notification module 124. Each base electronic device 112a-112c can include a base communication module 128. Cloud services 116 and servers 118a and 118b may each include an electronic device management module 126.

Base electronic devices 112a-112c, cloud services 116, one or more servers 118a and 118b, consumer electronic device 120, and business side electronic device 122 can be in communication with each other using network 114. Each electronic device 110a-110c can be in communication with a corresponding base electronic device 112a-112c through a wireless personal area network (e.g., Bluetooth®, infrared data, wireless uniform serial bus (USB), etc.) or through a physical connection (e.g., a Universal Serial Bus (USB) type connection). For example, base electronic device 112a can be in communication with and correspond to electronic devices 110a and 110d, base electronic device 112b can be in communication with and correspond to electronic device 110b, base electronic device 112c can be in communication with and correspond to electronic device 110c etc.

Elements of FIG. 1 may be coupled to one another through one or more interfaces employing any suitable connections (wired or wireless), which provide viable pathways for network (e.g., network 114) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained. Wearable computers (also known as body-borne computers or wearables) are miniature electronic devices that are worn by the bearer under, with, or on top of clothing. This class of wearable technology has been developed for general or special purpose information technologies and media development. Wearable computers are especially useful for applications that require more complex computational support than just hardware coded logics. Current wearable computers are often relatively large devices that stand out and are not aesthetic pleasing. Also, the use of current wearable computers requires the user to make non-discreet gestures or easily noticed and often distracting interactions with the wearable computer.

A communication system that includes user interaction with a wearable device, as outlined in FIG. 1, can resolve these issues (and others). In communication system 100 of FIG. 1, communication system 100 can be configured to allow a user to make unobtrusive or discreet gestures to initiate a preconfigured message or action, unobtrusively or discreetly receive notifications about events, initiate an action with simple natural hand-motions, and other similar features using a small form factor electronic device (e.g., electronic device 110a) that can be a wearable computer coupled (e.g., mechanically attached) to an article worn by a user such as a typical piece of jewelry (e.g., a wrist-watch, bracelet, necklace, purse, belt, etc. and worn as a fashion accessory). The term "unobtrusive notification" includes a notification that is discreet, inconspicuous, subtle, or otherwise not readily noticeable by other. The term "unobtrusive input" includes an input by a user that is discreet, inconspicuous, subtle, or otherwise not readily noticeable by other. The electronic device can include integrated sensors (e.g., accelerometers, gyros, magnetometers, pressure-sensors, touch-sensors, battery sensor, temperature sensor, etc), integrated actuators (e.g., multicolor LEDs, vibration motors, sound emitters, etc), a processor, microprocessor or system-on-a chip, volatile and non-volatile memory, wireless communication capabilities (e.g., Bluetooth®), and a rechargeable battery. Communication system 100 can be configured to allow communications related to brand messages such as messages sent by a brand or company, preconfigured messages such as a digital kiss, digital love note, emoji, reminder, sequence of lights and/or hepatics, or some other preconfigured message or notification that is automatically sent when triggered, fake calls, missed very important person (VIP) calls, incoming calls or messages, incoming VIP calls, messages from a VIP (e.g., SMS, MMS, etc.), or any other type of messages or notifications. Communication system 100 can also be configured to allow for customization, multi electronic device management, a user web portal, a brand web portal, and a usage and analytics portal.

Turning to the infrastructure of FIG. 1, communication system 100 in accordance with an example embodiment is shown. Generally, communication system 100 can be implemented in any type or topology of networks. Network 114 represents a series of points or nodes of interconnected communication paths for receiving and transmitting packets of information that propagate through communication system 100. Network 114 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network. In an example, messages notifications, etc. may be pushed to electronic device 110a from base electronic device 112 when electronic device 110a is in a low power state and the pushed message, notification, etc. can wake electronic device 110a from the low power state.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, network 114, cloud services 116, and servers 118a and 118b are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, electronic devices 110a-110d, base electronic devices 112a-112c, servers 118a and 118b, consumer electronic device 120, and supplier electronic device 122 can include memory elements for storing information to be used in the operations outlined herein. Each electronic device 110a-110d, base electronic device 112a-112c, server 118a and 118b, consumer electronic device 120, and business side electronic device 122 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic devices 110a-110d, base electronic devices 112a-122c, servers 118a and 118b, consumer electronic device 120, and business side electronic device 122 may include software modules (e.g., notification module 124, electronic device management module 126, and base communication module 128) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each electronic device 110a-110d, base electronic device 112a-112c, server 118a and 118b, consumer electronic device 120, and business side electronic device 122 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Each base electronic device 112a-112c can be a network element and includes, for example, desktop computers, laptop computers, mobile devices, personal digital assistants, smartphones, tablets, or other similar devices. Cloud services 116 may generally be defined as the use of computing resources that are delivered as a service over a network, such as the Internet. Typically, compute, storage, and network resources are offered in a cloud infrastructure, effectively shifting the workload from a local network to the cloud network. Servers 118a and 118b can be a network element such as a server or virtual server and can be associated with clients, customers, endpoints, or end users wishing to initiate a communication in communication system 100 via some network (e.g., network 114). The term 'server' is inclusive of devices used to serve the requests of clients and/or perform some computational task on behalf of clients within communication system 100.

Although notification module 124 is represented in FIG. 1 as being located in electronic devices 110a-110d, electronic device management module 126 is represented in FIG. 1 as being located in cloud services 116 and servers 118a and 118b, and base communication module 128 is represented in FIG. 1 as being located in base electronic devices 112a-112c, this is for illustrative purposes only. Notification module 124, electronic device management module 126, and base communication module 128 could be combined or separated in any suitable configuration. Furthermore, electronic device management module 126 could be integrated with or distributed in another network accessible by each base electronic devices 112a-112c.

Figure 2:
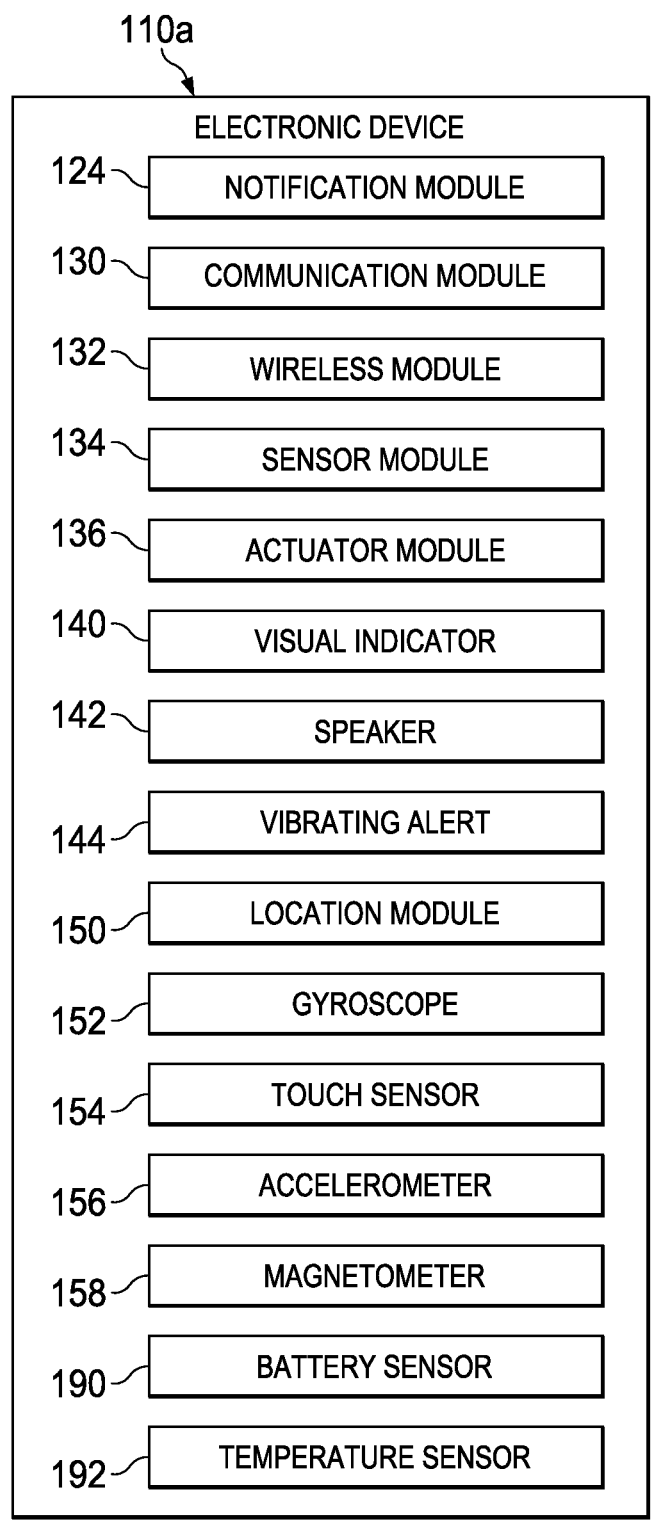
FIG. 2 is a simplified block diagram of a portion of a communication system in accordance with an embodiment of the present disclosure.

Turning to FIG. 2, FIG. 2 is a simplified block illustrating electronic device 110a in accordance with one example implementation. Electronic device 110a can include notification module 124, a communication module 130, a wireless module 132, a sensor module 134, an actuator module 136, a visual indicator 140, a speaker 142, a vibrating alert 144, a location module 150, a gyroscope 152, a touch sensor 154, an accelerometer 156, a magnetometer 158, a battery sensor 190, and a temperature sensor 192. Visual indicator 140 is configured to provide a visual signal, alert, indication, etc. to a user. Visual indicator 140 can include an array of multi-colored light emitting diodes (LEDs).

Speaker 142 is configured to provide an audio signal, alert, indication, etc. to a user. Vibrating alert 144 is configured to provide a vibrating alert, alert, indication, etc. to a user. Vibrating alert 144 can include a small electric motor connected to an eccentric or unbalanced weight. Location module 150 can be configured to determine the location of electronic device 110a. Location module 150 can include a global positioning system (GPS) device or some other device to determine the location of electronic device 110a.

Gyroscope 152 can be configured to measure the orientation of electronic device 110a. Gyroscope 152 can include a microchip-packaged MEMS gyroscope, solid-state ring laser gyroscope, fiber optic gyroscope, quantum gyroscope, etc. Touch sensor 154 can detect contact from the user. One or more touch sensors 154 may be located on and around electronic device 110a. Accelerometer 156 can be configured to measure acceleration and may be configured to measure proper acceleration (physical acceleration) as opposed to coordinate acceleration (rate of change of velocity). Magnetometer 158 can be configured to measure the direction of the Earth's magnetic field at a point in space. In an example, magnetometer 158 may be used as a compass. Battery sensor can be configured to determine the battery level (or an approximate battery level) of electronic device 110a and communicate the battery level to the user. If the determined battery level is below a threshold, an alert can be communicated to the user. Temperature sensor 192 can be configured to determine the temperature (or an approximate temperature) of electronic device 110a and/or a surrounding environment and communicate the determined temperature to the user. If the temperature is above or below a predetermined threshold, then an alert can be communicated to the user.

Notification module 124 can be configured to send notifications or alerts to a user of electronic device 110a. For example, in response to a phone call or text message, notification module 124 can active one or more of visual indicator 140, speaker 142, and vibrating alert 144. Communication module 130 can be configured to communicate with base electronic device 112a using wireless module 132 or some other type of communication path (e.g., a physical connection such as a USB connection or some other physical connection). Sensor module 134 can be configured to collect and analyze sensor data. For example, sensor module 134 can determine the position of electronic device 110a using location module 150 and magnetometer 158, the orientation of electronic device 110a using gyroscope 152, user input to the device using touch sensor 154 and/or accelerometer 156, etc. Actuator module 136 can be configured to convert energy into motion to move or controlling a mechanism or system, such as to communicate an alert using vibrating alert 144.

Figure 3:
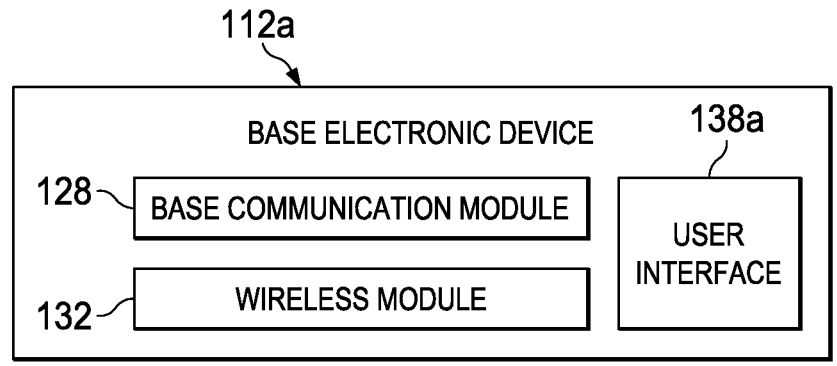
FIG. 3 is a simplified block diagram of a portion of a communication system in accordance with an embodiment of the present disclosure.

Turning to FIG. 3, FIG. 3 is a simplified block diagram illustrating base electronic device 112a in accordance with one example implementation. Base electronic device 112a can include base communication module 128, wireless module 132, and a user interface (UI) 138a. Wireless module 132 can be configured to wirelessly communication with electronic device 110a (e.g., Bluetooth®, infrared data, wireless uniform serial bus (USB), etc.). Base communication module 134 can be configured to receive a command or action and communicate data to communication module 130 in electronic device 110a using wireless module 132. UI 138a can be configured to communicate with a user.

Figure 4:
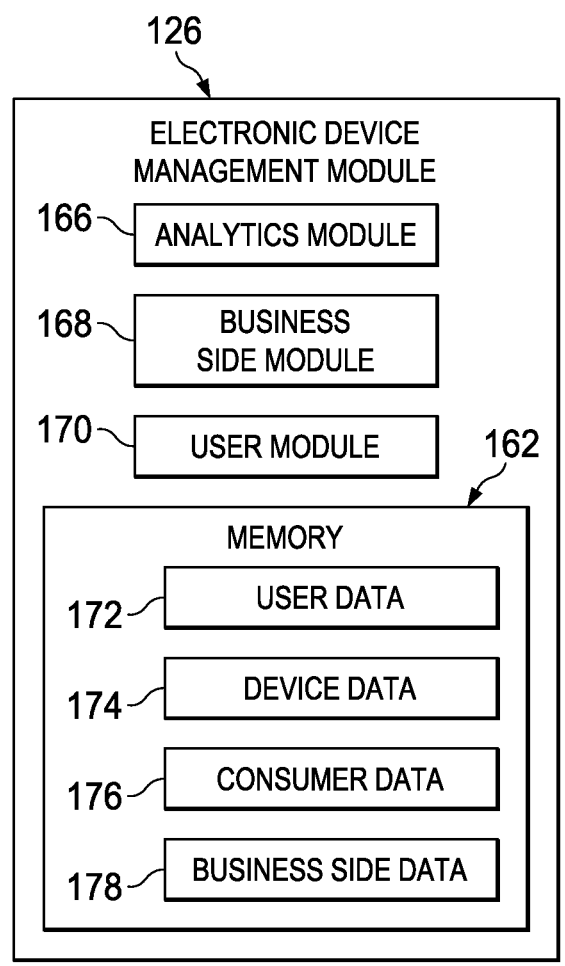
FIG. 4 is a simplified block diagram of a portion of a communication system in accordance with an embodiment of the present disclosure.

Turning to FIG. 4, FIG. 4 is a simplified block diagram illustrating electronic device management module 126 in accordance with one example implementation. Electronic device management module 126 can include memory 162, an analytics module 166, a business side module 168, and a user module 170. Memory 162 can include user data 172, device data 174, consumer data 176, and business side data 178. Analytics module 166 can be configured to provide analytics or meaningful patterns in data related to each one or more electronic devices 110a-110d as well provide analytics related to one or more electronic devices 110a-110d as a group. Business side module 168 can be configured to provide a portal or UI for business end users (e.g., retailers, manufactures, suppliers, etc.) of communication system 100. User module 170 can be configured to provide a portal or UI for end users of one or more electronic devices 110a-110d.

User data 172 can include data related to each specific user of one or more electronic devices 110a-110d. More specifically, user data 172 can include the age of a user, location, gender, race, income, education, or other demographics as well as preferences such as travel preferences, entertainment, etc. Device data 174 can include data related to each one or more electronic devices 110a-110d such as frequency of use, identification (ID) (e.g., media access control address (MAC) address), model, version, etc. Consumer data 176 can include consumer data related to each user such as the retail stores the user shops in, the types of products the user purchases, the amount the user typically spends, etc. Business end data 178 can include business end related data such as the amount of times a retailer has sent a message to each one or more electronic devices 110a-110d.

Figure 5:
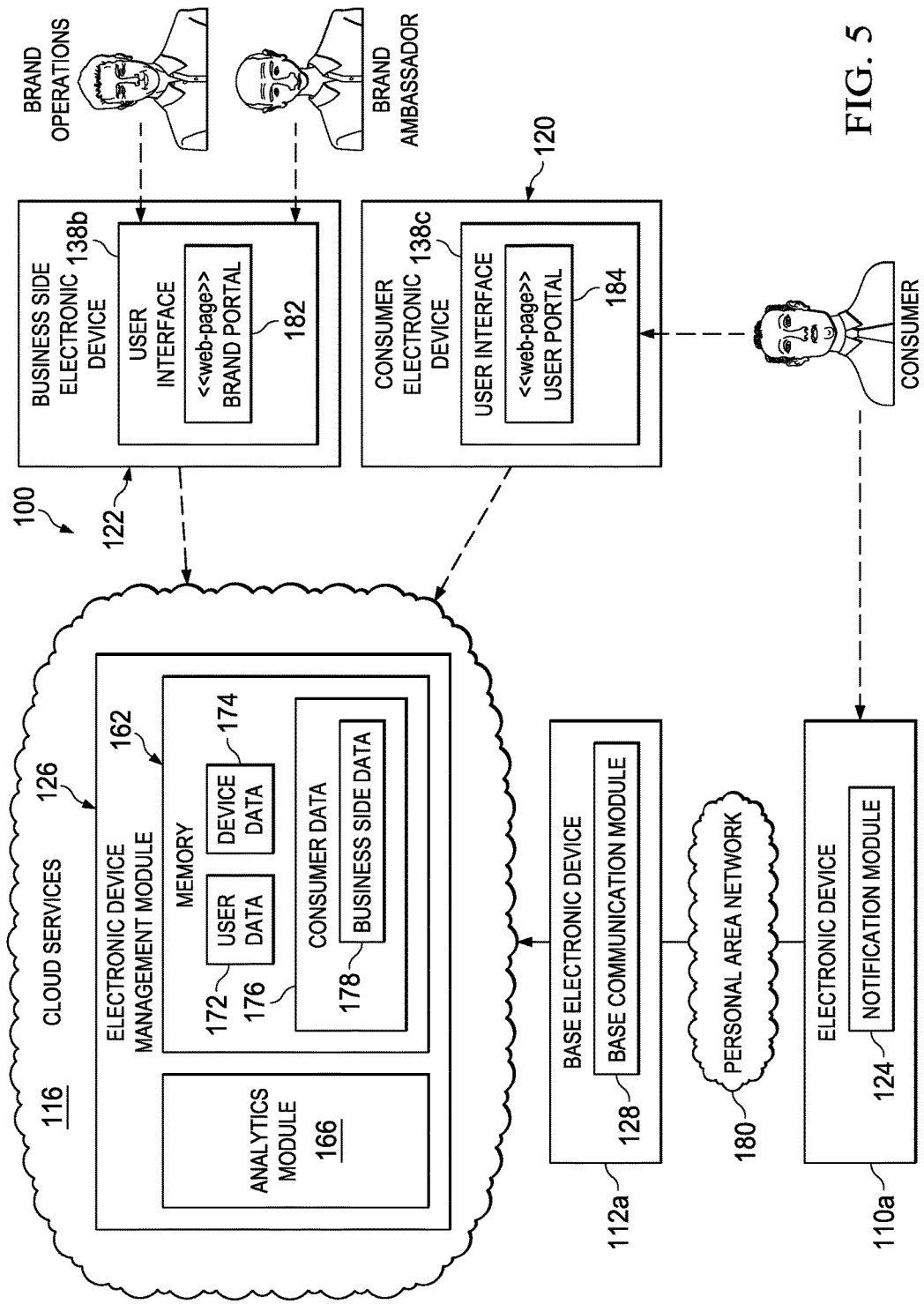
FIG. 5 is a simplified block diagram of a communication system in accordance with an embodiment of the present disclosure.

Turning to FIG. 5, FIG. 5 is a simplified block diagram illustrating communication system 100 in accordance with one example implementation. As shown in FIG. 5, a business end user (e.g., a brand operations manager or brand ambassador for a retailer, manufacture, supplier, etc.) can access a brand portal 182 through UI 130 on supplier 8b electronic device 122. Using brand portal 182, the business end user can manage advertisements, messages or alerts that a business may want to send, manage data collected by electronic devices 110a-110d, and other business related activities.

An end user (e.g., a consumer) can access a user portal 184 through UI 138c of consumer electronic device 120 and configure each electronic device that is associated with base electronic device 112a, view status details about each associated electronic device (e.g., connection status, battery level, etc.), configure contacts, configure notifications or alerts, preconfigure messages, and other end user activities.

Figure 6:
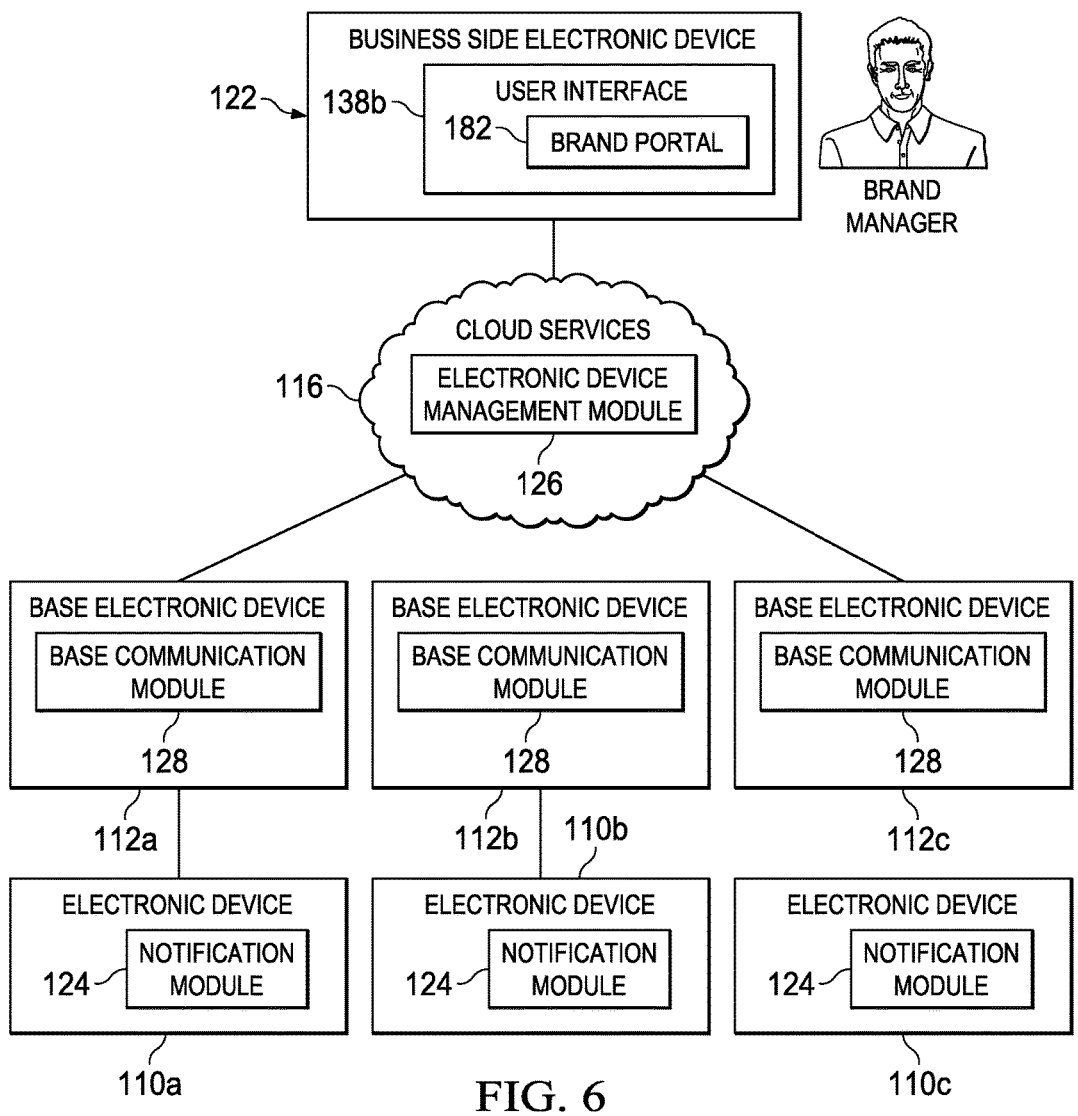
FIG. 6 is a simplified block diagram of a communication system in accordance with an embodiment of the present disclosure.

Turning to FIG. 6, FIG. 6 is a simplified block diagram illustrating communication system 100 in accordance with one example implementation. As shown in FIG. 6, using cloud services 116, business side electronic device 122 may be in communication with a plurality of base electronic devices 112a-112c and corresponding electronic devices 110a-110c respectively. In an example, brand portal 182 may be accessed by a brand manager and data may be entered into brand portal 182 using UI 138b. The entered data may be related to information about a promotional event for a specific brand. The information about the promotion event can be sent from business side electronic device 122 to electronic device management module 126 in cloud services 116. Electronic device management module 126 can determine what electronic devices should receive the information about the promotion event. For example, electronic device management module 126 may determine that electronic devices 110a and 110c should receive the information but not electronic device 110b. The user of electronic device 110b may have elected to not receive information about promotion events, may not met requirements for the promotion (e.g., too young, outside a geographic area, etc.) may not be associated with the specific brand, etc. The information is then communicated to base electronic device 112a and 112c to pass along to electronic device 110a and 110c. If an electronic device is not connected, for example, electronic device 110c is shown as not connected to base electronic device 112c, then the information about the promotional event may be stored until electronic device 110c is connected to base electronic device 112c when the information can be delivered to electronic device 110c.

Figure 7:
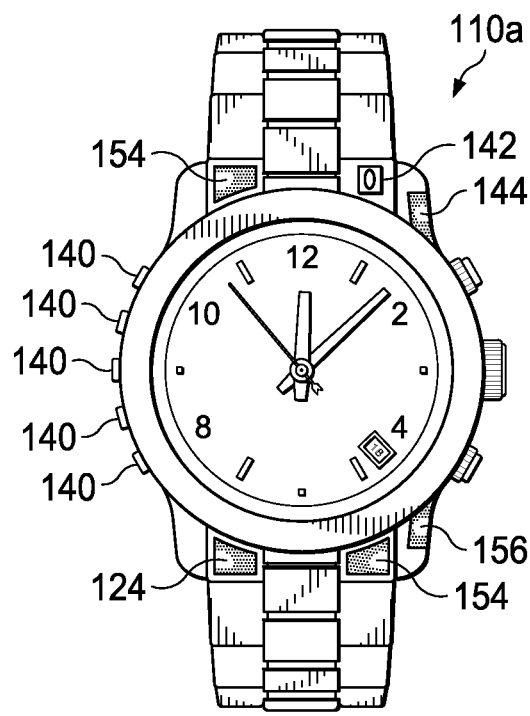
FIG. 7 is a simplified block diagram of a portion of a communication system in accordance with an embodiment of the present disclosure.

Turning to FIG. 7, FIG. 7 is a simplified block diagram illustrating electronic device 110a in accordance with one example implementation. As shown in FIG. 7, electronic device 110a is illustrated as a watch, however, electronic device 110a may be any wearable computer. Electronic device 110a can include notification module 124, one or more visual indicators 140, speaker 142, vibrating alert 144, touch sensor 154, and accelerometer 156. Visual indicator 140 can include an array of multi-colored light emitting diodes (LEDs) that are triggered by sensor module 134. For example, when a user of electronic device 110a receives a text message from a friend, one or more visual indicator 140 may illuminate. In another example, visual indicator 140 may illuminate in a pattern to indicate the identity of the friend. Also, speaker 142 may give an audio signal when the friend calls and the audio signal may be a general sound that alerts the user of the phone call or may be a specific sound to indicate the identity of the friend. The audio signal may be given in conjunction with the visual signal from visual indicator 140 or may be given instead of the visual signal from visual indicator 140. Vibrating alert 144 can give a vibration alert to identify the friend. Visual indicator 140, speaker 142, and vibrating alert 144 can be used separately or in conjunction with each other in any combination. Also each of visual indicator 140, speaker 142, and vibrating alert 144 may use a unique pattern or frequency to identify a specific event, such as a call from a specific person. For example, when the friend calls, visual indicator 140 may emit a blue light, then a red light, and then back to the blue light, or any (or almost any) other combination of colors and patterns. Speaker 142 may emit a sound, series of sounds or tones in conjunction with visual indicator 140 or separate from visual indicator 140. Vibrating alert 144 may have a vibration sequence or pattern that is used in conjunction with visual indicator 140 and speaker 142 when the friend calls or vibrating alert 144 may be used separately from visual indicator 140 and speaker 142.

Touch sensors 154 can detect contact from the user and the contact may initiate a specific action. For example, contact on one touch sensor 154 may send a pre-programmed message to a person or place. Also, accelerometer 156 can detect movement of a portion of the user's body that includes electronic device 110a and may initiate a pre-programmed action based on the movement. For example, if electronic device 110a is a watch, as illustrated in FIG. 7, and a user waves the hand that is wearing the watch in a specific pattern, then a signal may be sent to schedule or request a taxi service.

Figure 8:
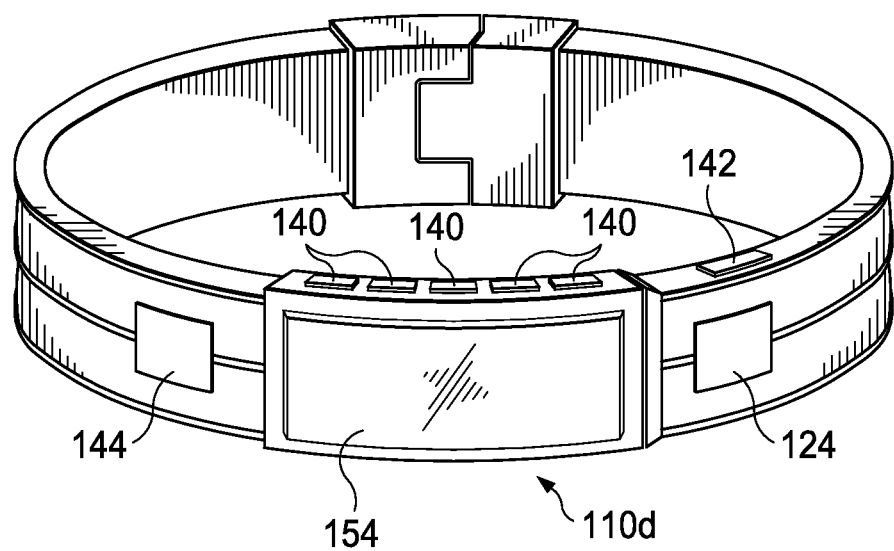
FIG. 8 is a simplified block diagram of a portion of a communication system in accordance with an embodiment of the present disclosure.

Turning to FIG. 8, FIG. 8 is a simplified block diagram illustrating electronic device 110d in accordance with one example implementation. As shown in FIG. 8, electronic device 110d is illustrated as a bracelet, however, electronic device 110d may be any wearable computer. Electronic device 110d can include notification module 124, visual indicator 140, speaker 142, vibrating alert 144, and touch sensor 154. Visual indicator 140, speaker 142, vibrating alert 144, and touch sensor 154 may be configured to operate the same as visual indicator 140, speaker 142, vibrating alert 144, and touch sensor 154 on electronic device 110a or can be configured to operate in a different manner than visual indicator 140, speaker 142, vibrating alert 144, and touch sensor 154 on electronic device 110a. For example, visual indicator 140 may give the same or different visual indication when the friend calls.

Turning to FIG. 9, FIG. 9 is a simplified block diagram illustrating base electronic device 112a in accordance with one example implementation. Electronic device 110a can include UI 138a. As illustrated, UI 138a is displaying a consumer UI 186a. Consumer UI 186a can include a graphical representation of electronic device 110a illustrated in FIG. 7 and a graphical representation of electronic device 110d illustrated in FIG. 8. Using consumer UI 186a a user can configure each electronic device that is associated with base electronic device 112a and view status details about each associated electronic device (e.g., connection status, battery level, etc.).

Turning to FIG. 10, FIG. 10 is a simplified block diagram illustrating base electronic device 112a in accordance with one example implementation. As illustrated in FIG. 10 a user has selected electronic device 110a from UI 138a illustrated in FIG. 9 and UI 138a is now displaying a consumer UI 186b related to settings for electronic device 110a. For example, the user can power on or off electronic device 110a, communicate with wireless module 132 (e.g., turn a Bluetooth® or wireless connection on or off), activate location module 150 and locate electronic device 110a, etc. Other settings or functions could also be provided and those illustrated in FIG. 10 are merely examples.

Turning to FIG. 11, FIG. 11 is a simplified block diagram illustrating base electronic device 112a in accordance with one example implementation. As illustrated in FIG. 11, base electronic device 112a has received several messages for a user and a consumer UI 186c related to the messages can be displayed in UI 138a. When one or more messages are received by base electronic device 112a, electronic device 110a and/or electronic device 110d may alert the user. The alert may be specific to the type of message, who the message is from, or any number of factors.

Figures 13, 14:
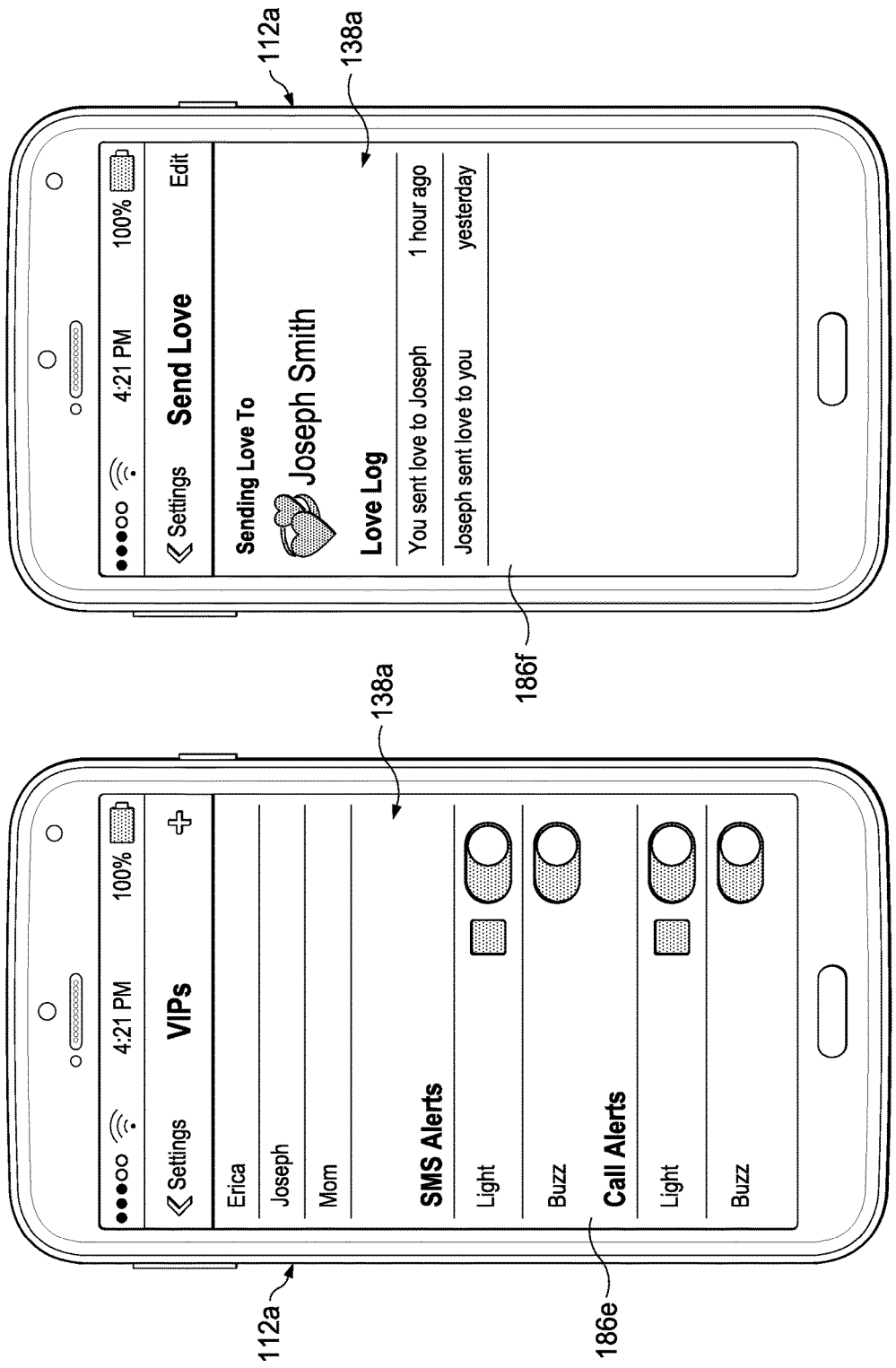
FIG. 13 is a simplified block diagram of a portion of a communication system in accordance with an embodiment of the present disclosure.
FIG. 14 is a simplified block diagram of a portion of a communication system in accordance with an embodiment of the present disclosure.

Turning to FIG. 12, FIG. 12 is a simplified block diagram illustrating base electronic device 112a in accordance with one example implementation. As illustrated in FIG. 12, a user has selected a specific message from the messages illustrated in FIG. 10. When a message is selected, a consumer UI 186d related to the specific message can be displayed in UI 138a can display the specific message on base electronic device 112a Turning to FIG. 13, FIG. 13 is a simplified block diagram illustrating base electronic device 112a in accordance with one example implementation. As illustrated in FIG. 13, UI 138a is displaying a consumer UI 186e related to a very important person (VIP) or VIPs designated by the user. For example, the user can add contacts to a VIP list, configure the signal electronic device 110a and/or 110d will give when the VIP calls or sends a message, or other VIP related configurations. The VIP configurations can apply to the VIP group as a whole or the user can configure settings unique to each VIP.

Turning to FIG. 14, FIG. 14 is a simplified block diagram illustrating base electronic device 112a in accordance with one example implementation. As illustrated in FIG. 14, UI 138a is displaying a consumer UI 1186f that includes a log of preconfigured messages a user has sent to a person. For example, the user has sent a preselected emoji to a person named Joseph Smith. The user may have configured electronic device 110a to send the preconfigured message when the user touches one or more touch sensors 164 in a specific manner.

Figures 15, 16:
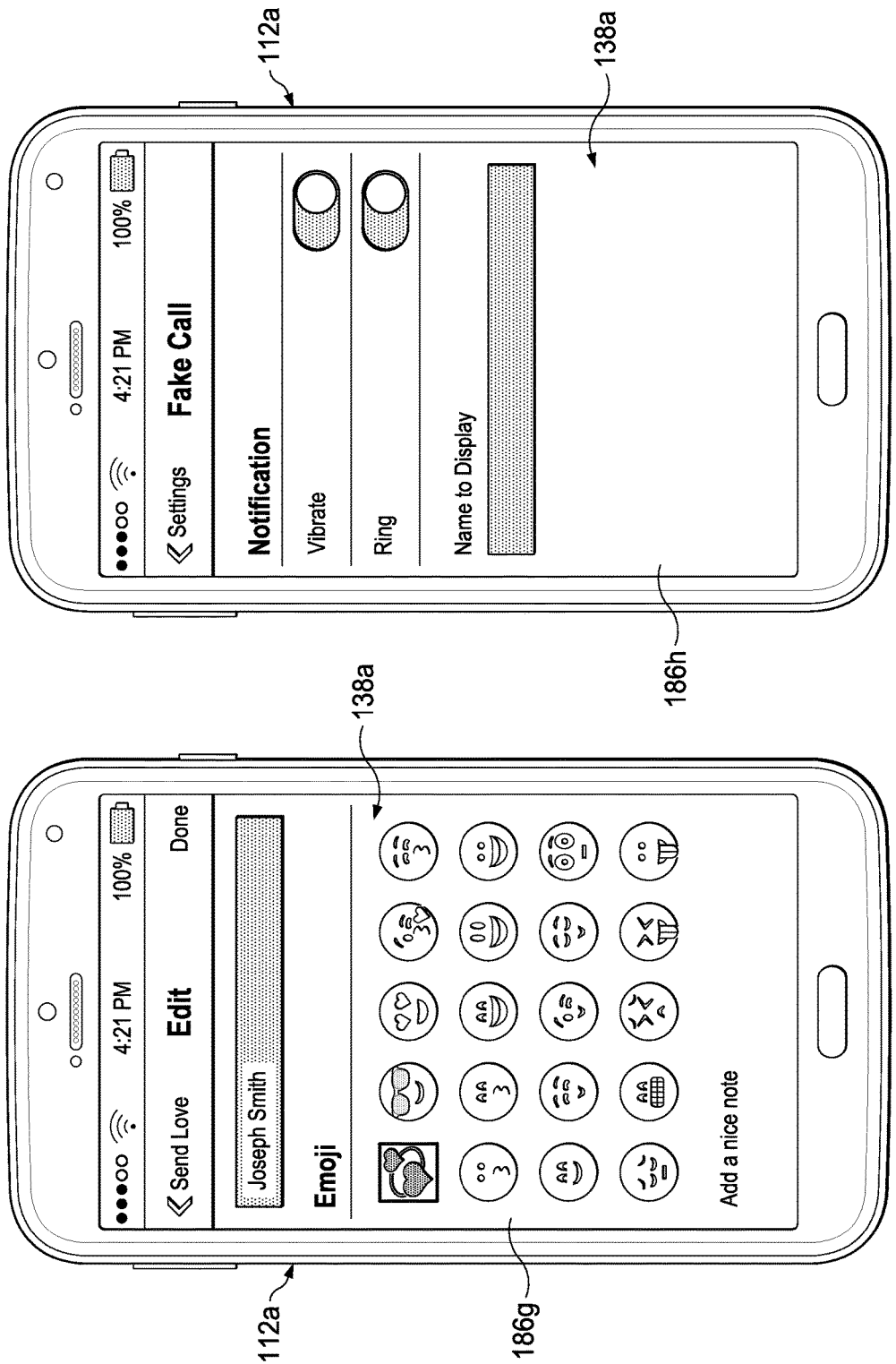
FIG. 15 is a simplified block diagram of a portion of a communication system in accordance with an embodiment of the present disclosure.
FIG. 16 is a simplified block diagram of a portion of a communication system in accordance with an embodiment of the present disclosure.

Turning to FIG. 15, FIG. 15 is a simplified block diagram illustrating base electronic device 112a in accordance with one example implementation. As illustrated in FIG. 15, UI 138a is displaying a consumer UI 186g related to emoji that can be associated with a contact (e.g., Joseph Smith). Using consumer UI 186g, a user can select an emoji to be associated with a person when configuring a preconfigured message for the person.

Turning to FIG. 16, FIG. 16 is a simplified block diagram illustrating base electronic device 112a in accordance with one example implementation. As illustrated in FIG. 16, UI 138a is displaying a consumer UI 186h associated with a fake call setting that will be used when a fake call is initiated by the user. For example, when the user touches one or more touch sensors 154 in a specific manner, base electronic device 112a can vibrates and ring as if base electronic device 112a had received an actual call.

Figure 17:
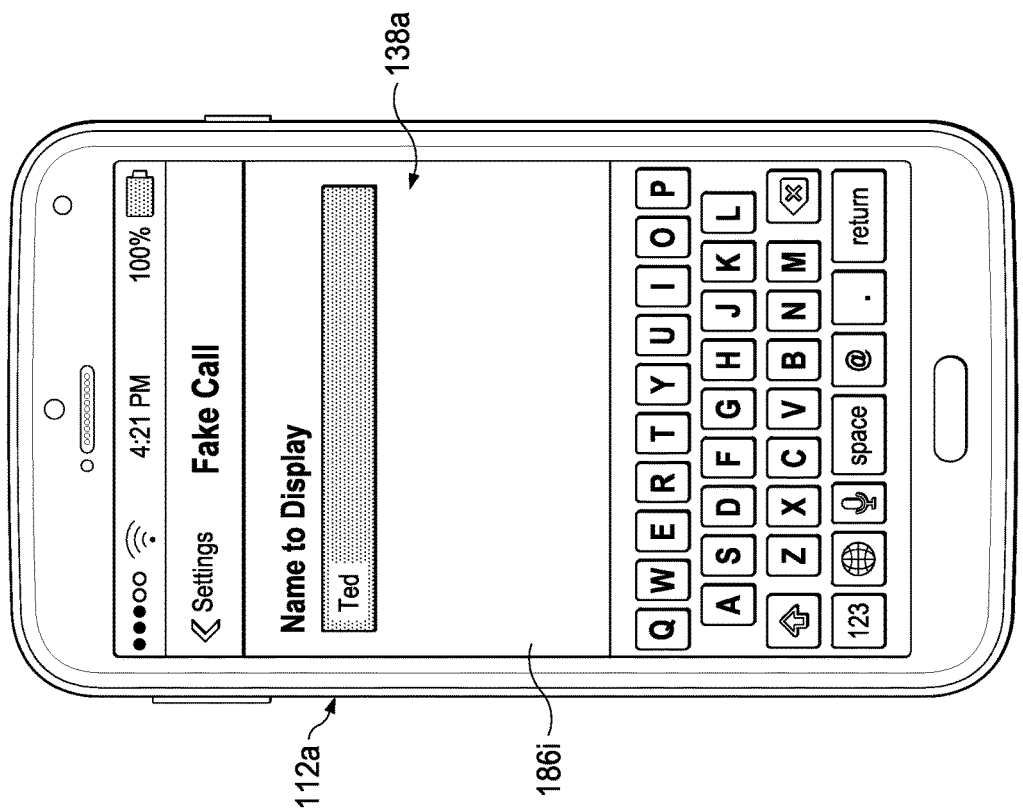
FIG. 17 is a simplified block diagram of a portion of a communication system in accordance with an embodiment of the present disclosure.

Turning to FIG. 17, FIG. 17 is a simplified block diagram illustrating base electronic device 112a in accordance with one example implementation. As illustrated in FIG. 17, UI 138a is displaying a consumer UI 186i where the user can select a name to display when a fake call is initiated. By displaying a name during the fake call, authenticity can be added to the fake call.

Figure 18:
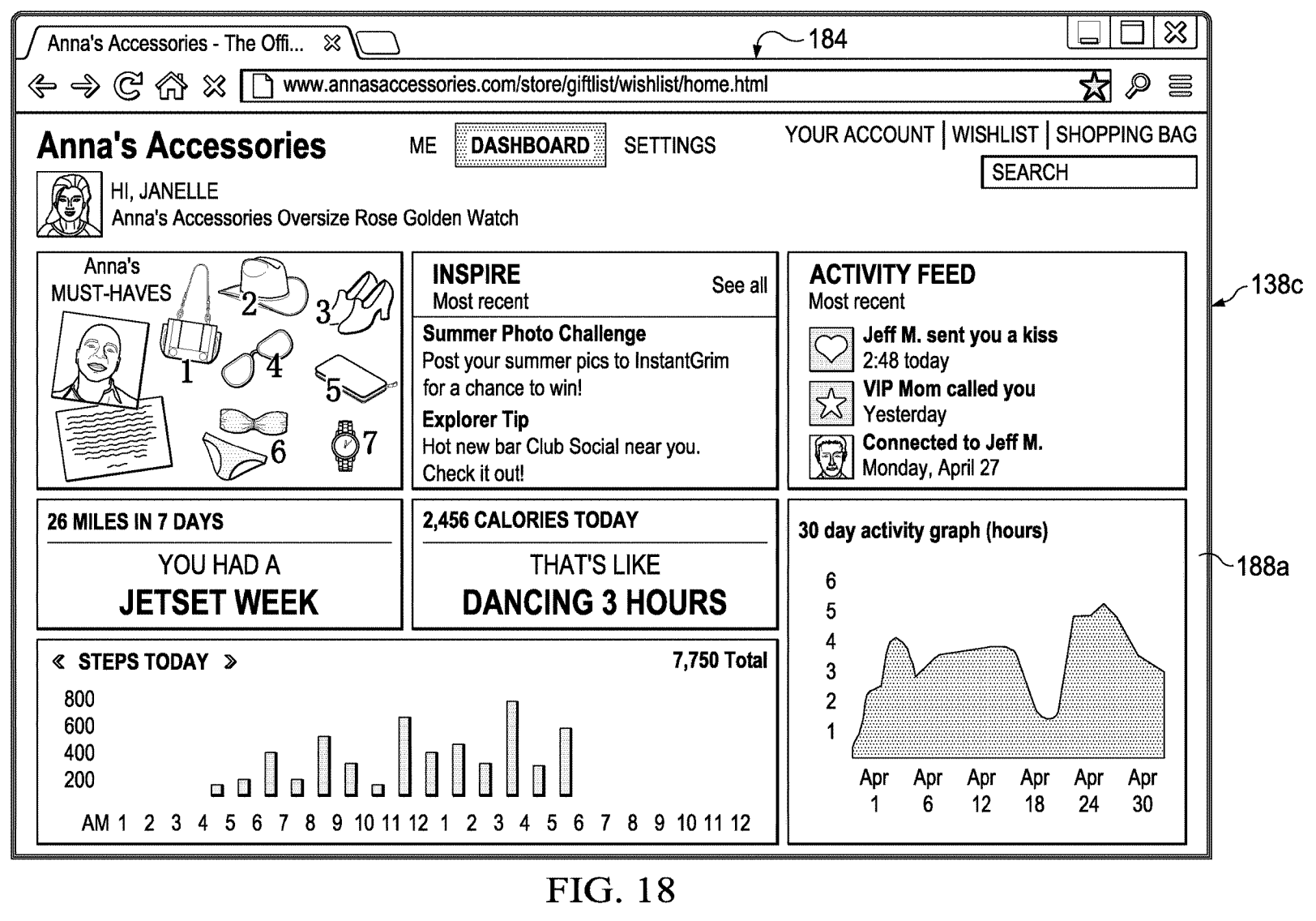

Turning to FIG. 18, FIG. 18 is a simplified block diagram illustrating one example of UI 138c that may be displayed on consumer electronic device 120. UI 138c on consumer electronic device 120 can include user portal 184 for a user to interact with data acquired by each electronic device 110a-d that is associated with the user. As illustrated in FIG. 18, UI 138c is displaying an end user UI 188a. End user UI 118a can include a home page that includes products the user may want to purchase, inspiring messages, an activity feed, miles traveled by the user, calories burned by the user, steps taken by the user etc. The miles traveled, calories burned, and steps taken can be determined using location module 150, gyroscope 152, accelerometer 156, and magnetometer 158.

Figure 19:
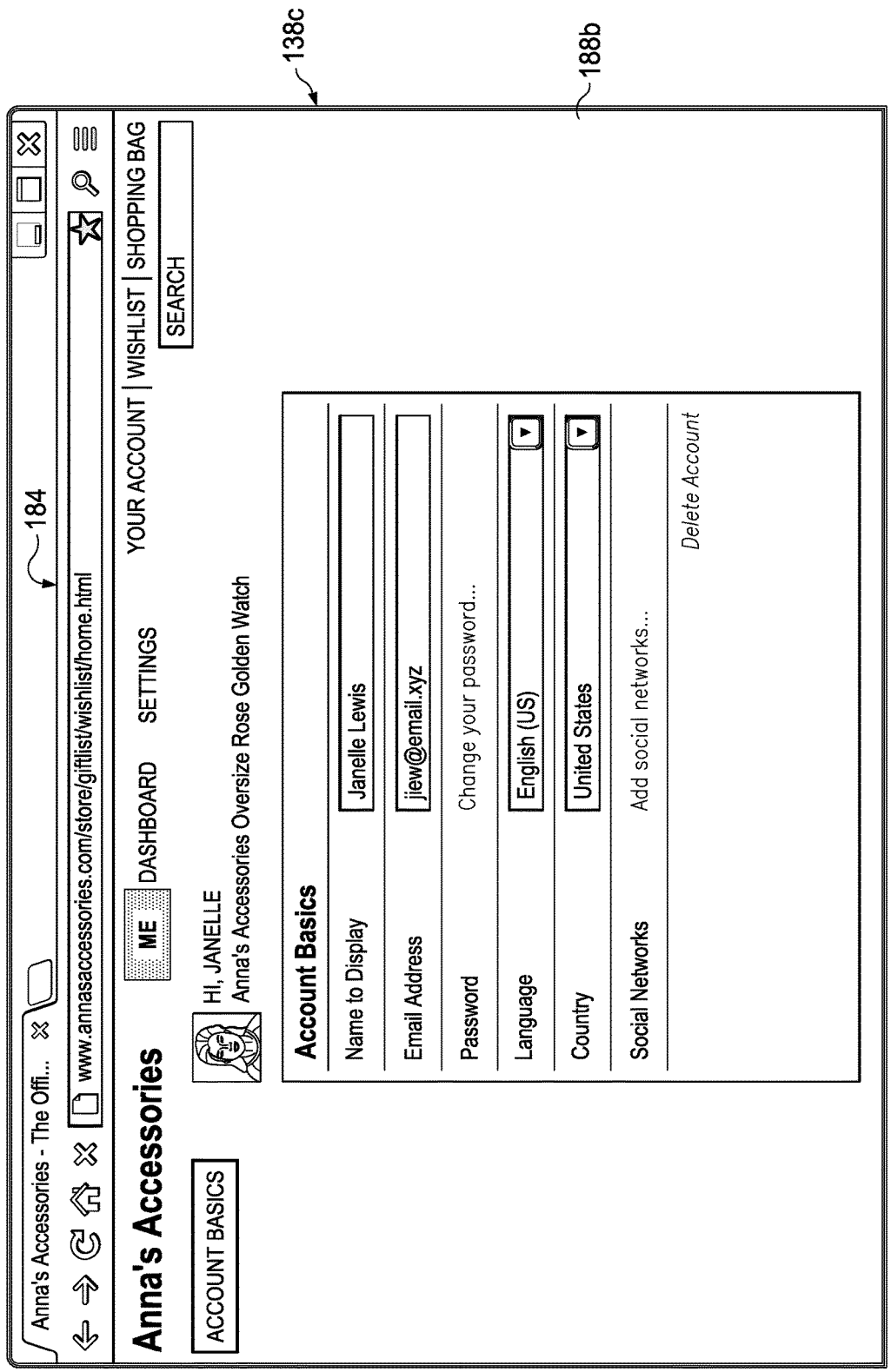
FIG. 19 is a simplified block diagram of a portion of a communication system in accordance with an embodiment of the present disclosure.

Turning to FIG. 19, FIG. 19 is a simplified block diagram illustrating one example of UI 138c that may be displayed on consumer electronic device 120 through user portal 184. As illustrated in FIG. 19, UI 138c can include end user UI 188b. End user UI 118b can display a login screen or initial set up screen that a user may use to access data related to each electronic device 110a-d that is associated with the user. The data displayed may be stored in user data 172.

Figure 20:
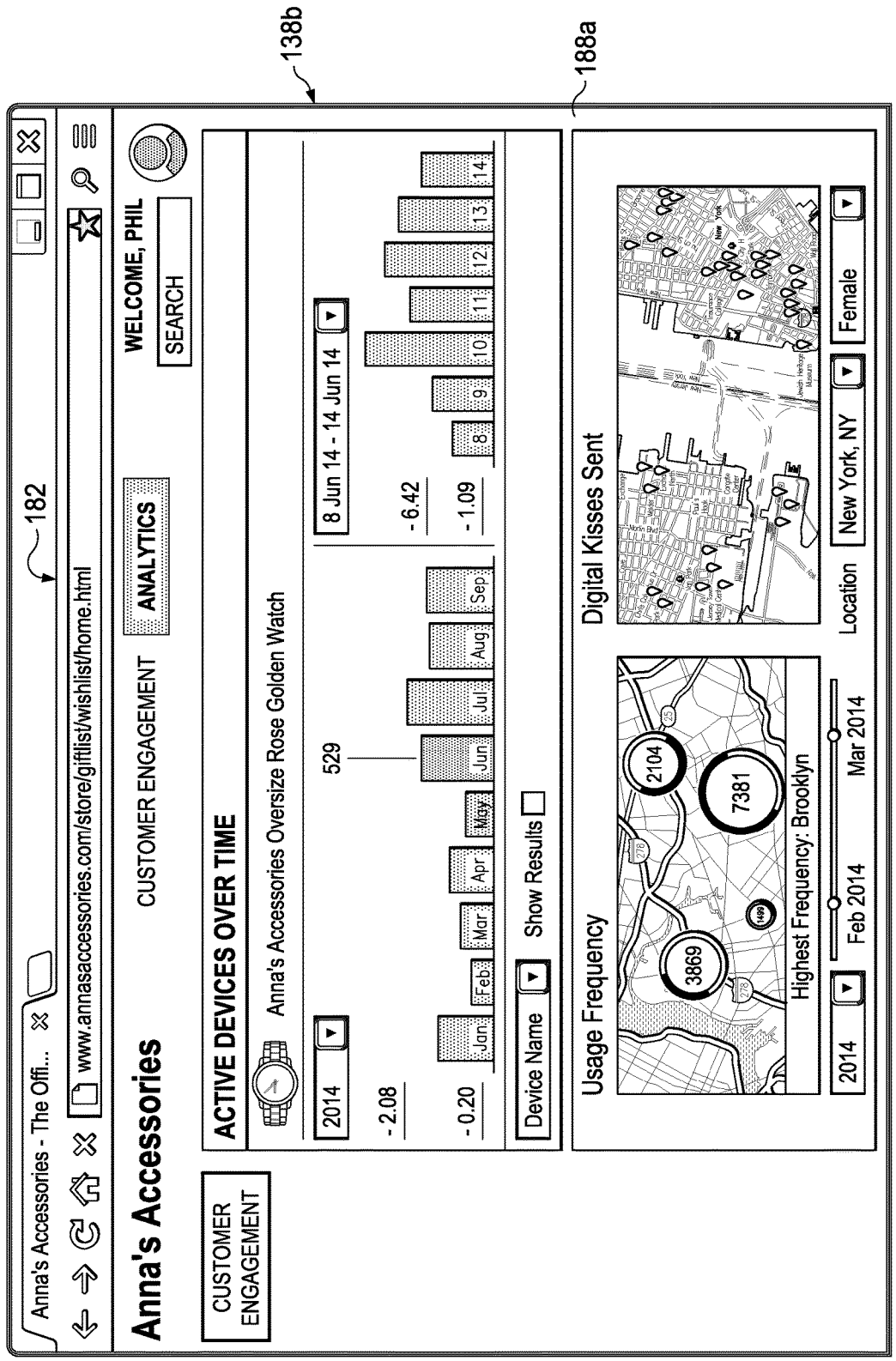
FIG. 20 is a simplified block diagram of a portion of a communication system in accordance with an embodiment of the present disclosure.

Turning to FIG. 20, FIG. 20 is a simplified block diagram illustrating one example of UI 138b that may be displayed on business side electronic device 122. As illustrated in FIG. 18, UI 138b is displaying one example of brand portal 182 that includes business side UI 188a. Business side UI 188a can include data related to each one or more electronic devices 110a-d that is associated with a particular business (e.g., a retailer, manufacture, etc.). For example, business side UI 188a is displaying data related to an electronic device similar to electronic device 110a as illustrated in FIG. 7. Business side UI 188a can include data related to active electronic devices over time, the usage frequency for a given area or areas, and amount of digital kisses sent, and any other data gathered or analyzed. The data displayed on business side UI 188a may be stored in business side data 178.

Figure 21:
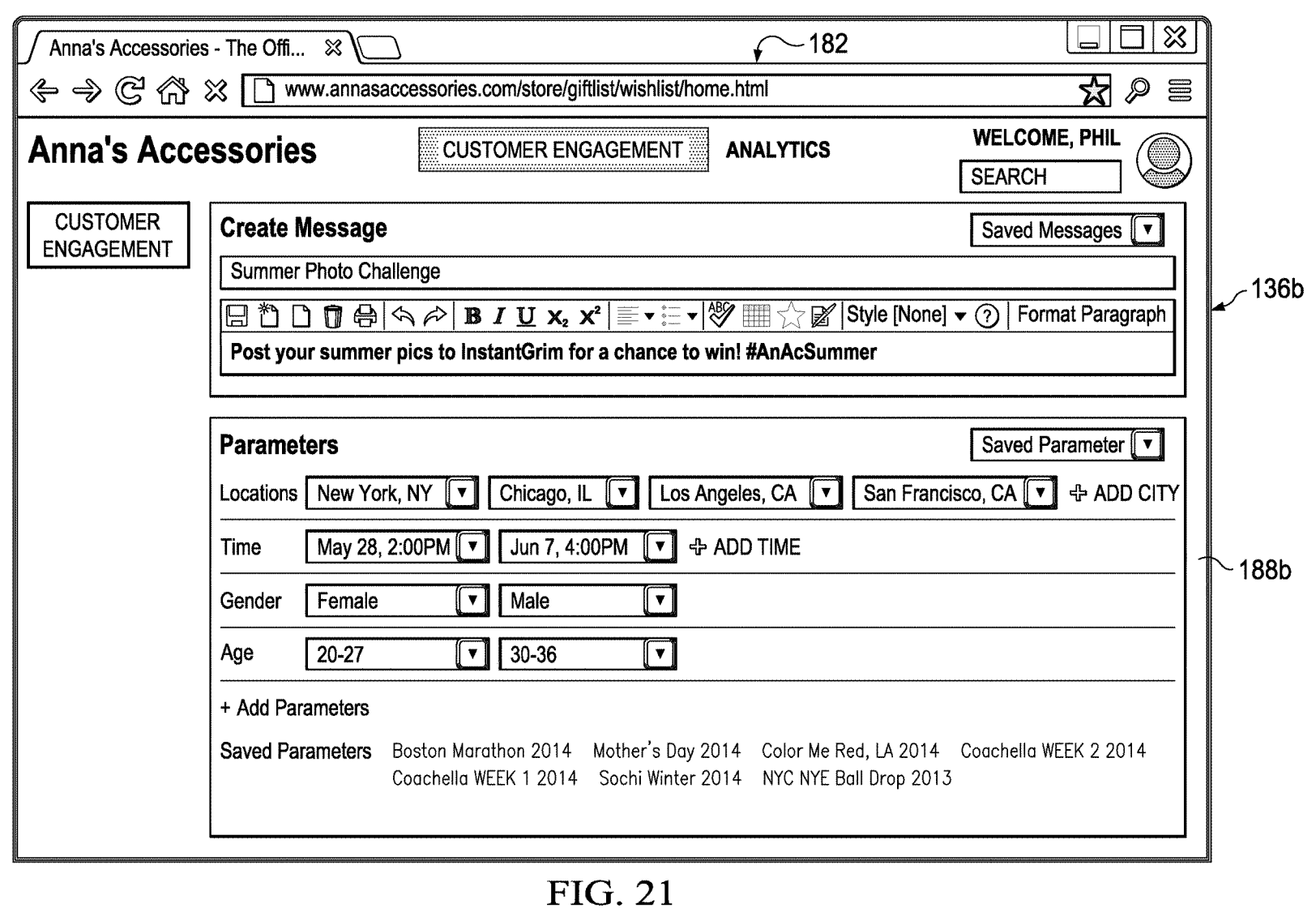

Turning to FIG. 21, FIG. 21 is a simplified block diagram illustrating one example of UI 138b that may be displayed on business side electronic device 122. As illustrated in FIG. 18, UI 138b is displaying one example of brand portal 182 that includes business side UI 188b. Business side UI 188b is displaying a message that a business may want to send to all the electronic devices (e.g., electronic devices 110a-100d) associated with the business or a product related to the business. Using business side UI 188b, a business can create a message, set the parameters of the message and set or send the message. For example, a business can set the location the message should be sent, the time the message should be sent, the gender and age of the user that should receive the message, etc. The parameters can be acquired from consumer data 176. The specific message created in FIG. 21 is for a summer photo challenge. The message can be communicated to electronic device 112a and displayed in message UI 186c as illustrated in FIG. 11.

Figure 22:
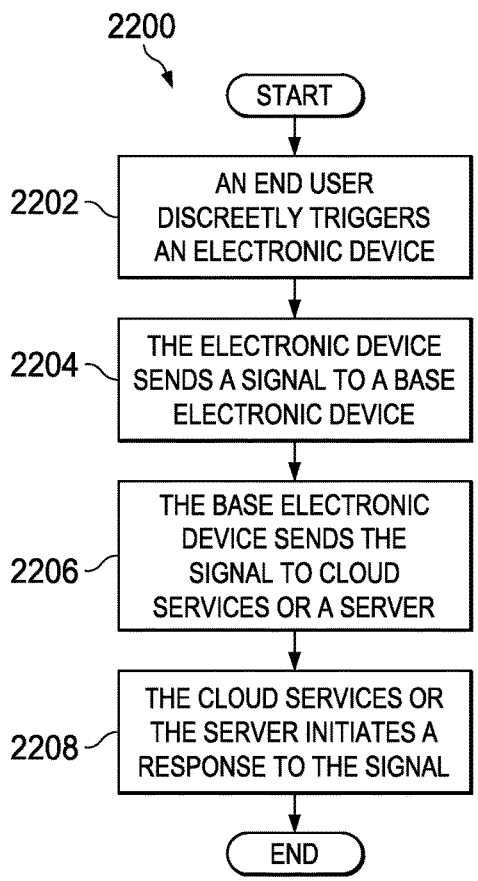
FIG. 22 is a simplified flowchart illustrating potential operations that may be associated with the communication system in accordance with an embodiment.

Turning to FIG. 22, FIG. 22 is an example flowchart illustrating possible operations of a flow 2200 that may be associated with a user's interaction with electronic device 110a, in accordance with an embodiment. In an embodiment, one or more operations of flow 2200 may be performed by notification module 124. At 2202, an end user discreetly (or unobtrusively) triggers an electronic device. For example, a user may active touch sensor 154 on electronic device 110a by discreetly or unobtrusively touching the outside of the watch face. The user may make contact with touch sensor 154 in a predetermined manner that signals the user wishing to send a digital kiss to another person. At 2204, the electronic device sends a signal to a base electronic device. At 2206, the base electronic device sends the signal to cloud services or a server. At 2208, the cloud services or the server initiates a response to the signal. For example, cloud services 116 may send the digital kiss to the other person.

Figure 23:
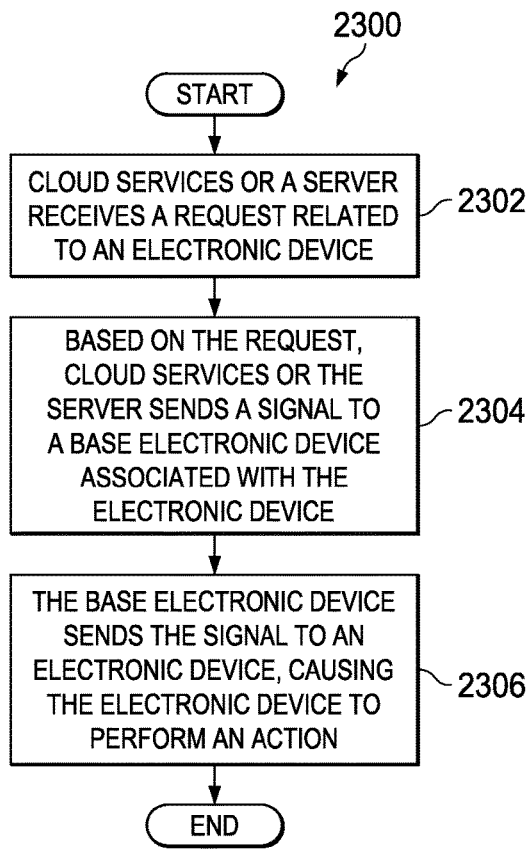
FIG. 23 is a simplified flowchart illustrating potential operations that may be associated with the communication system in accordance with an embodiment.

Turning to FIG. 23, FIG. 23 is an example flowchart illustrating possible operations of a flow 2300 that may be associated with a user's interaction with electronic device 110a, in accordance with an embodiment. In an embodiment, one or more operations of flow 2200 may be performed by electronic device management module 126. At 2302, cloud services or a server receives a request related to an electronic device. For example, cloud services 116 may have received a digital kiss signal from electronic device 110a that is intended for a user of electronic device 110b. At 2304, based on the request, cloud services or the server sends a signal to a base electronic device associated with the electronic device. For example, cloud services 116 may send a signal to base electronic device 112b associated with electronic device 110b. At 2306, the base electronic device sends the signal to an electronic device, causing the electronic device to perform an action. For example, in response to receiving the digital kiss, electronic device 110b may cause visual indicator 140 to illuminate in a specific pattern or speaker 142 to make a specific sound.

Figure 24:
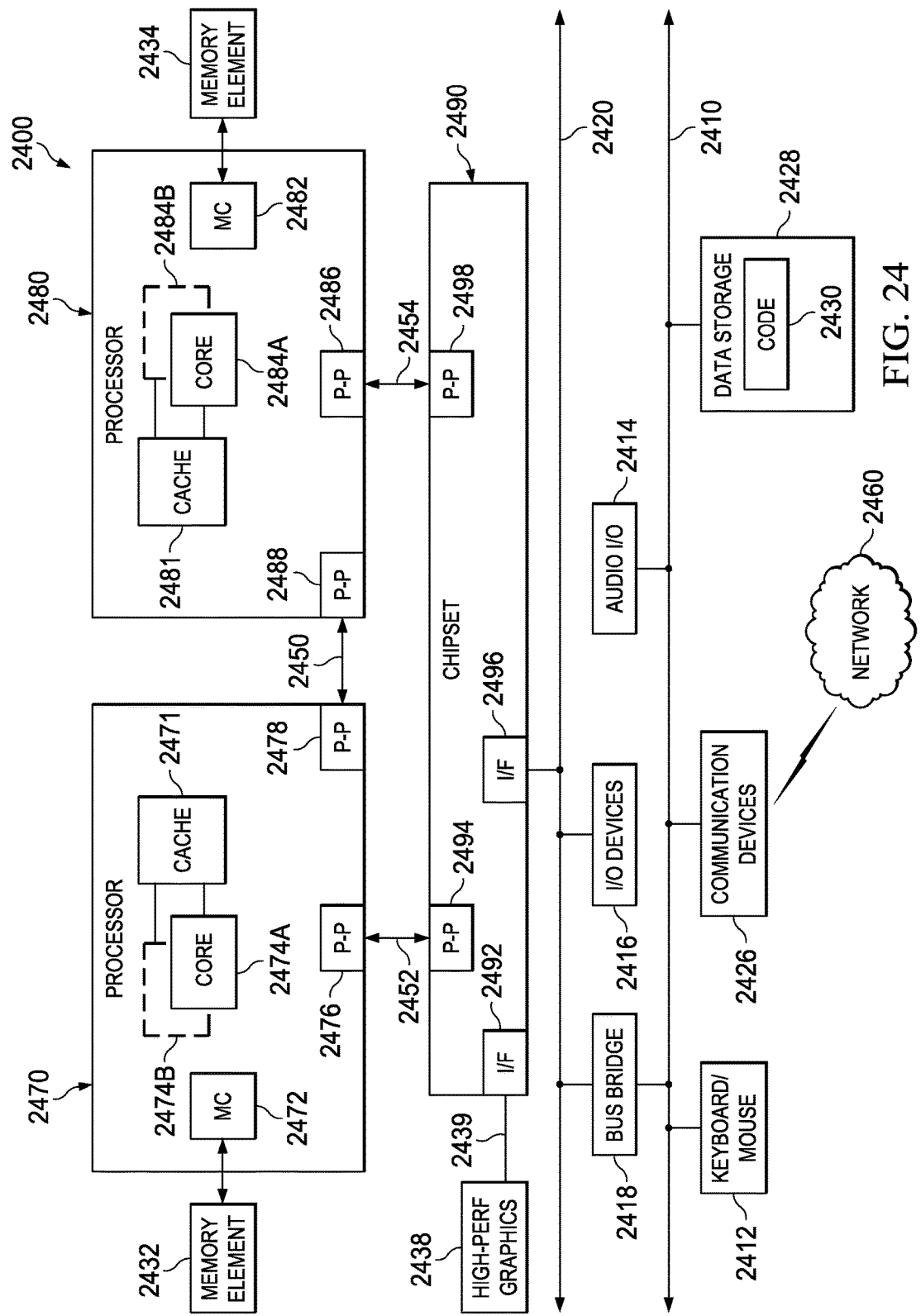
FIG. 24 is a block diagram illustrating an example computing system that is arranged in a point-to-point configuration in accordance with an embodiment.

FIG. 24 illustrates a computing system 2400 that is arranged in a point-to-point (PtP) configuration according to an embodiment. In particular, FIG. 24 shows a system where processors, memory, and input/output devices are interconnected by a number of point-to-point interfaces. Generally, one or more of the network elements of communication system 10 may be configured in the same or similar manner as computing system 2400.

As illustrated in FIG. 24, system 2400 may include several processors, of which only two, processors 2470 and 2480, are shown for clarity. While two processors 2470 and 2480 are shown, it is to be understood that an embodiment of system 2400 may also include only one such processor. Processors 2470 and 2480 may each include a set of cores (i.e., processor cores 2474A and 2474B and processor cores 2484A and 2484B) to execute multiple threads of a program. The cores may be configured to execute instruction code in a manner similar to that discussed above with reference to FIGS. 1-5. Each processor 2470, 2480 may include at least one shared cache 2471, 2481. Shared caches 2471, 2481 may store data (e.g., instructions) that are utilized by one or more components of processors 2470, 2480, such as processor cores 2474 and 2484.

Processors 2470 and 2480 may also each include integrated memory controller logic (MC) 2472 and 2482 to communicate with memory elements 2432 and 2434. Memory elements 2432 and/or 2434 may store various data used by processors 2470 and 2480. In alternative embodiments, memory controller logic 2472 and 2482 may be discreet logic separate from processors 2470 and 2480.

Processors 2470 and 2480 may be any type of processor and may exchange data via a point-to-point (PtP) interface 2450 using point-to-point interface circuits 2478 and 2488, respectively. Processors 2470 and 2480 may each exchange data with a chipset 2490 via individual point-to-point interfaces 2452 and 2454 using point-to-point interface circuits 2476, 2486, 2494, and 2498. Chipset 2490 may also exchange data with a high-performance graphics circuit 2438 via a high-performance graphics interface 2439, using an interface circuit 2492, which could be a PtP interface circuit. In alternative embodiments, any or all of the PtP links illustrated in FIG. 24 could be implemented as a multi-drop bus rather than a PtP link.

Chipset 2490 may be in communication with a bus 2420 via an interface circuit 2496. Bus 2420 may have one or more devices that communicate over it, such as a bus bridge 2418 and I/O devices 2416. Via a bus 2410, bus bridge 2418 may be in communication with other devices such as a keyboard/mouse 2412 (or other input devices such as a touch screen, trackball, etc.), communication devices 2426 (such as modems, network interface devices, or other types of communication devices that may communicate through a computer network 2460), audio I/O devices 2414, and/or a data storage device 2428. Data storage device 2428 may store code 2430, which may be executed by processors 2470 and/or 2480. In alternative embodiments, any portions of the bus architectures could be implemented with one or more PtP links.

The computer system depicted in FIG. 24 is a schematic illustration of an embodiment of a computing system that may be utilized to implement various embodiments discussed herein. It will be appreciated that various components of the system depicted in FIG. 24 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 25:
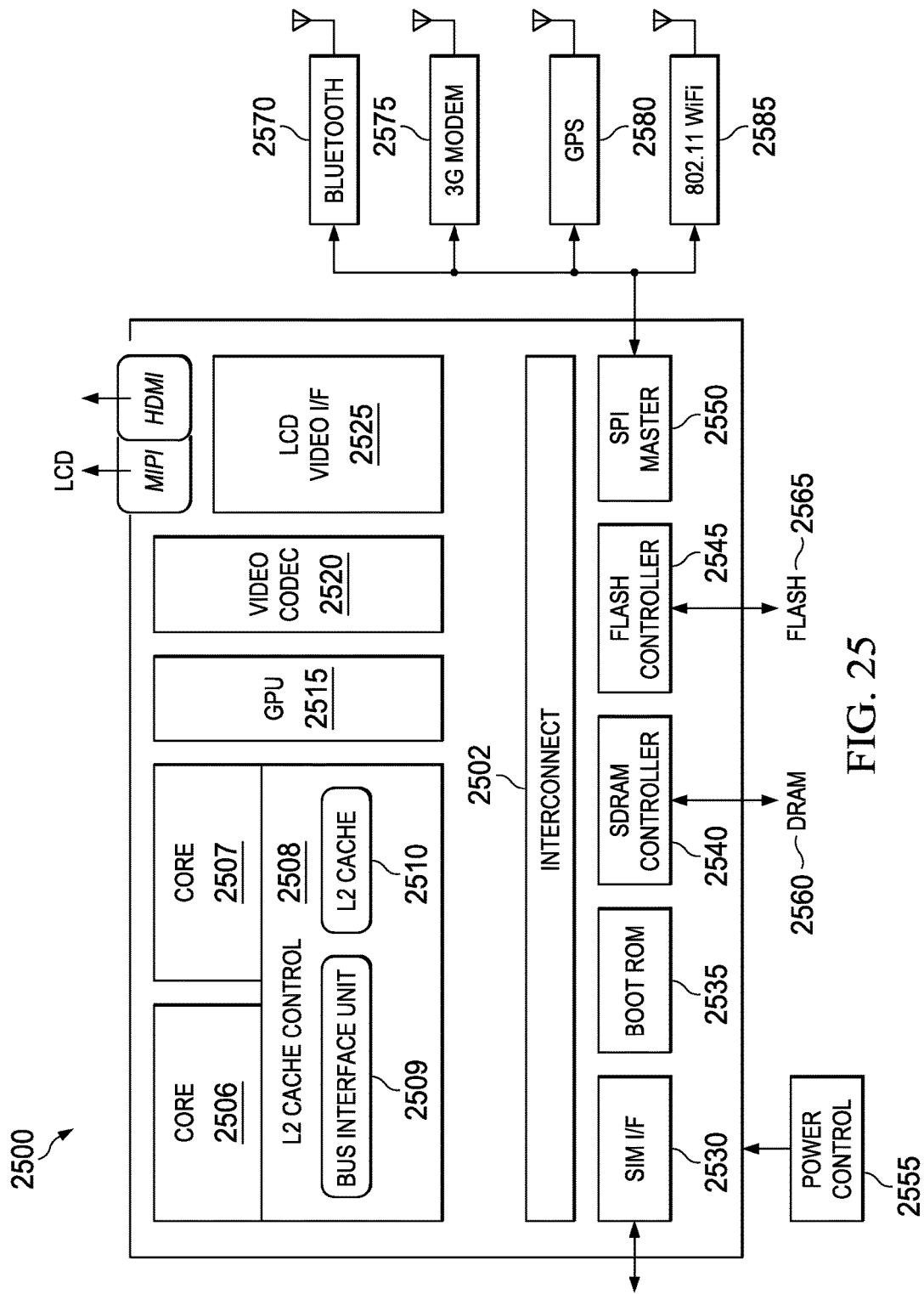
FIG. 25 is a simplified block diagram associated with an example ARM ecosystem system on chip (SOC) of the present disclosure.

Turning to FIG. 25, FIG. 25 is a simplified block diagram associated with an example ARM ecosystem SOC 2500 of the present disclosure. At least one example implementation of the present disclosure can include the determination of a reputation through network characteristics features discussed herein and an ARM component. For example, the example of FIG. 25 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 25, ARM ecosystem SOC 2500 may include multiple cores 2506-2507, an L2 cache control 2508, a bus interface unit 2509, an L2 cache 2510, a graphics processing unit (GPU) 2515, an interconnect 2502, a video codec 2520, and a liquid crystal display (LCD) I/F 2525, which may be associated with mobile industry processor interface (MIPI)/high-definition multimedia interface (HDMI) links that couple to an LCD.

ARM ecosystem SOC 2500 may also include a subscriber identity module (SIM) I/F 2530, a boot read-only memory (ROM) 2535, a synchronous dynamic random access memory (SDRAM) controller 2540, a flash controller 2545, a serial peripheral interface (SPI) master 2550, a suitable power control 2555, a dynamic RAM (DRAM) 2560, and flash 2565. In addition, one or more example embodiments include one or more communication capabilities, interfaces, and features such as instances of Bluetooth™ 2570, a 3G modem 2575, a global positioning system (GPS) 2580, and an 802.11 Wi-Fi 2585.

In operation, the example of FIG. 25 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 26:
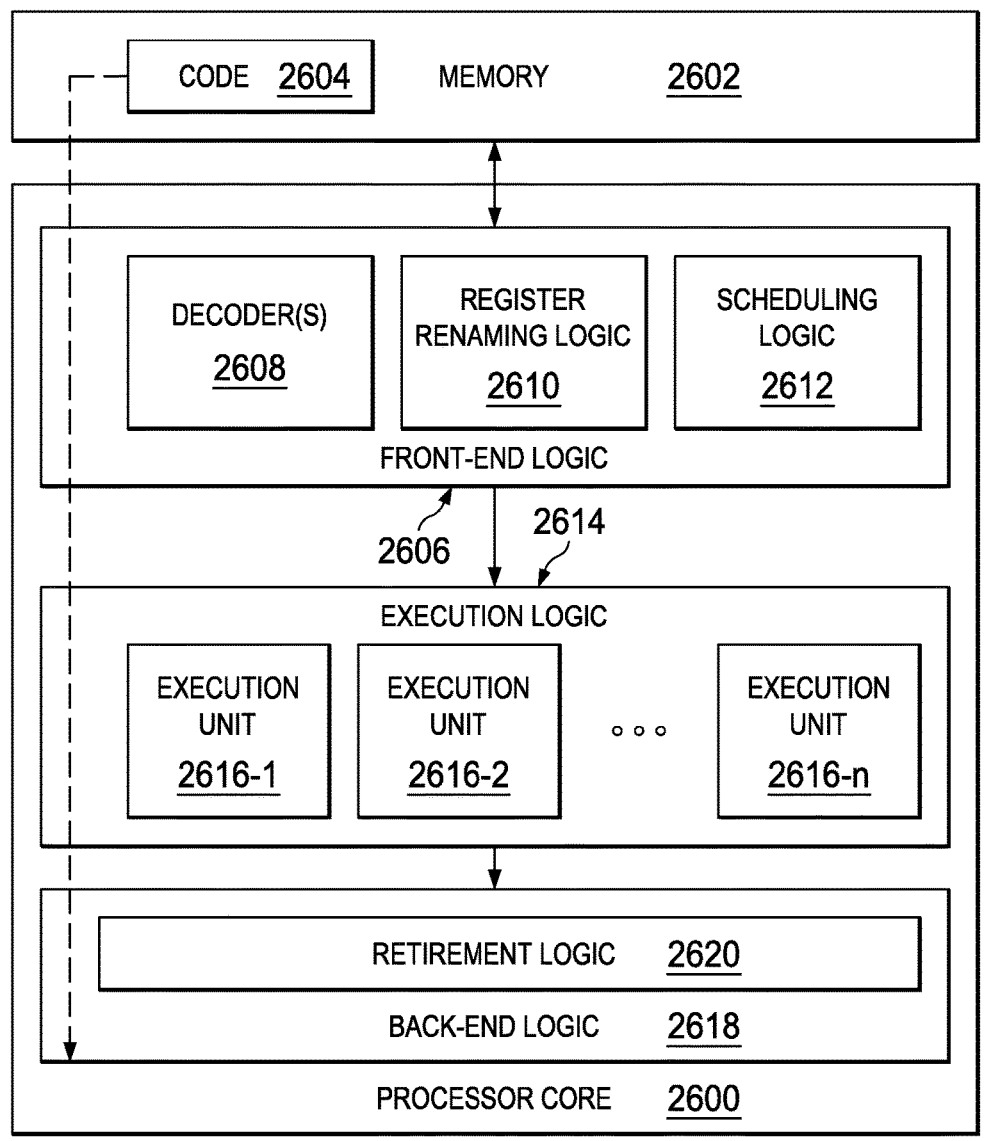
FIG. 26 is a block diagram illustrating an example processor core in accordance with an embodiment.

FIG. 26 illustrates a processor core 2600 according to an embodiment. Processor core 2600 may be the core for any type of processor, such as a micro-processor, an embedded processor, a digital signal processor (DSP), a network processor, or other device to execute code. Although only one processor core 2600 is illustrated in FIG. 26, a processor may alternatively include more than one of the processor core 2600 illustrated in FIG. 26. For example, processor core 2600 represents one example embodiment of processors cores 2474a, 2474b, 2484a, and 2484b shown and described with reference to processors 2470 and 480 of FIG. 24. Processor core 2600 may be a single-threaded core or, for at least one embodiment, processor core 2600 may be multi-threaded in that it may include more than one hardware thread context (or "logical processor") per core.

FIG. 26 also illustrates a memory 2602 coupled to processor core 2600 in accordance with an embodiment. Memory 2602 may be any of a wide variety of memories (including various layers of memory hierarchy) as are known or otherwise available to those of skill in the art. Memory 2602 may include code 2604, which may be one or more instructions, to be executed by processor core 2600. Processor core 2600 can follow a program sequence of instructions indicated by code 2604. Each instruction enters a front-end logic 2606 and is processed by one or more decoders 2608. The decoder may generate, as its output, a micro operation such as a fixed width micro operation in a predefined format, or may generate other instructions, microinstructions, or control signals that reflect the original code instruction. Front-end logic 2606 also includes register renaming logic 2610 and scheduling logic 2612, which generally allocate resources and queue the operation corresponding to the instruction for execution.

Processor core 2600 can also include execution logic 2614 having a set of execution units 2616-1 through 2616-N. Some embodiments may include a number of execution units dedicated to specific functions or sets of functions. Other embodiments may include only one execution unit or one execution unit that can perform a particular function. Execution logic 2614 performs the operations specified by code instructions.

After completion of execution of the operations specified by the code instructions, back-end logic 2618 can retire the instructions of code 2604. In one embodiment, processor core 2600 allows out of order execution but requires in order retirement of instructions. Retirement logic 2620 may take a variety of known forms (e.g., re-order buffers or the like). In this manner, processor core 2600 is transformed during execution of code 2604, at least in terms of the output generated by the decoder, hardware registers and tables utilized by register renaming logic 2610, and any registers (not shown) modified by execution logic 2614.

Although not illustrated in FIG. 26, a processor may include other elements on a chip with processor core 2600, at least some of which were shown and described herein with reference to FIG. 26. For example, as shown in FIG. 26, a processor may include memory control logic along with processor core 2600. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10 and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations in the preceding flow diagrams (i.e., FIGS. 22-23) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor cause the at least one processor to determine that an unobtrusive gesture has been received on a first electronic device and send a signal to a second electronic device (e.g., base electronic device) in response to the unobtrusive gesture.

In Example C2, the subject matter of Example C1 can optionally include where the first electronic device is a part of jewelry worn by a user.

In Example C3, the subject matter of any one of Examples C1-C2 can optionally include where the unobtrusive gesture is physical contact by a user.

In Example C4, the subject matter of any one of Examples C1-C3 can optionally include where the signal is a preconfigured event.

In Example C5, the subject matter of any one of Examples C1-C4 can optionally include where the signal is a digital kiss.

In Example A1, an apparatus can include a notification module, where the notification module is configured to receive a signal from a base electronic device, determine a unobtrusive output in response to the signal, and generate an unobtrusive notification in response to the received signal.

In Example, A2, the subject matter of Example A1 can optionally include where the electronic device is a part of jewelry worn by a user.

In Example A3, the subject matter of any one of Examples A1-A2 can optionally include where the base electronic device is a smart phone and the smart phone received the signal from a network element.

In Example A4, the subject matter of any one of Examples A1-A3 can optionally include where the message is a signal from a person designated as a very important person.

In Example A5, the subject matter of any one of Examples A1-A4 can optionally include where the unobtrusive notification is a preconfigured response to the signal.

Example M1 is a method including receiving a predefined unobtrusive gesture from a user and sending a signal to a base electronic device in response to the predefined unobtrusive gesture to initiate a predetermined event.

In Example M2, the subject matter of Example M1 can optionally include where the predefined unobtrusive gesture is received on an electronic device that is a part of jewelry worn by the user.

In Example M3, the subject matter of any one of the Examples M1-M2 can optionally include where the predefined unobtrusive gesture is physical contact by a user.

In Example M4, the subject matter of any one of the Examples M1-M3 can optionally include where the predefined unobtrusive gesture is preconfigured by the user.

In Example M5, the subject matter of any one of the Examples M1-M4 can optionally include where the signal is a preconfigured message that is sent when a specific predefined action was performed.

Example S1 is a system for user interaction with a first electronic device, the system including a notification module configured to receive a signal from a second electronic device, determine an unobtrusive output in response to the signal, and generate an unobtrusive notification in response to the received signal.

In Example S2, the subject matter of Example S1 can optionally include where the signal from the second electronic device is related to a promotional event associated with the first electronic device.

In Example S3, the subject matter of any one of Examples S1-S2 can optionally include where the first electronic device is a part of jewelry worn by a user.

In Example S4, the subject matter of any one of Examples S1-S3 can optionally include where the wearable device can be further configured to determine that an unobtrusive gesture has been received on the first electronic device and send a first electronic device signal to the second electronic device in response to the unobtrusive gesture.

In Example S5, the subject matter of any one of Examples S1-S4 can optionally include where the unobtrusive notification is preconfigured.

Example X1 is a machine-readable storage medium including machine-readable instructions to implement a method or realize an apparatus as in any one of the Examples A1-A5, or M1-M5. Example Y1 is an apparatus comprising means for performing of any of the Example methods M1-M5. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one computer-readable medium comprising one or more instructions that when executed by at least one processor:
    determine that an unobtrusive touch input has been received from a user on a first electronic device, wherein the unobtrusive touch input is a predefined sequence of touch inputs not readily noticeable by others in the presence of the user, wherein the first electronic device is a part of jewelry worn by the user; and
    send a signal to two or more second electronic devices in response to the unobtrusive touch input.

2. The at least one computer-readable medium of claim 1, wherein the signal is a preconfigured event that causes a message to be communicated to a person other than the user.

3. The at least one computer-readable medium of claim 1, wherein the signal is a digital kiss.

4. The at least one computer-readable medium of claim 1, wherein one of the two or more second electronic devices includes a web portal where the user can track historical data related to the touch input and configure the first electronic device.

5. The at least one computer-readable medium of claim 1, wherein one of the two or more second electronic devices includes a web portal where the user can configure the predefined sequence of touch inputs.

6. An apparatus comprising:
    a notification module configured to:
        receive a signal from a base electronic device, wherein the base electronic device is associated with a user, wherein the signal was communicated to two or more electronic devices;
        determine an unobtrusive output from a first electronic device in response to the signal, wherein the first electronic device is a part of jewelry worn by the user; and
        generate an unobtrusive notification in response to the received signal, wherein the unobtrusive notification is not readily noticeable by others in the presence of the user.

7. The apparatus of claim 6, wherein the base electronic device is a smart phone and the smart phone received the signal from a network element.

8. The apparatus of claim 6, wherein the message is a signal from a person designated as a very important person.

9. The apparatus of claim 6, wherein the unobtrusive notification is a preconfigured response to the signal.

10. A method comprising:
    receiving, at a first electronic device, a predefined unobtrusive touch input from a user, wherein the unobtrusive touch input is a predefined sequence of touch inputs not readily noticeable by others in the presence of the user, wherein the first electronic device is a part of jewelry worn by a user; and
    sending a signal to a base electronic device in response to the predefined unobtrusive touch input to initiate a predetermined event, wherein the predetermined event causes a message to be communicated to two or more second electronic devices.

11. The method of claim 10, wherein the predefined unobtrusive touch input is preconfigured by the user.

12. The method of claim 10, wherein the signal is a preconfigured message that is sent to a person other than the user when a specific predefined action was performed.

13. A system for user interaction with a first electronic device, the system comprising:
    a notification module configured to:
        receive a signal from a second electronic device associated with the user, wherein the signal was communicated to two or more electronic devices;
        determine an unobtrusive output from the first electronic device in response to the signal, wherein the first electronic device is a part of jewelry worn by a second user; and
        generate a unobtrusive notification in response to the received signal, wherein the unobtrusive notification is not readily noticeable by others in the presence of the second user.

14. The system of claim 13, wherein the signal from the second electronic device is related to a promotional event associated with the first electronic device.

15. The system of claim 13, wherein the first electronic device can be configured to:
    determine that an unobtrusive touch input has been received on the first electronic device; and
    send a first electronic device signal to the second electronic device in response to the unobtrusive touch input.

16. The system of claim 13, wherein the unobtrusive notification is preconfigured.

* * * * *